(12) United States Patent
Li et al.

(10) Patent No.: US 12,408,056 B2
(45) Date of Patent: Sep. 2, 2025

(54) MEASUREMENT METHOD AND DEVICE

(71) Applicant: Samsung Electronics Co., Ltd., Gyeonggi-do (KR)

(72) Inventors: Lisi Li, Beijing (CN); Hong Wang, Beijing (CN); Xiaoning Ma, Beijing (CN); Weiwei Wang, Beijing (CN)

(73) Assignee: Samsung Electronics Co., Ltd., Seoul (KR)

( * ) Notice: Subject to any disclaimer, the term of this patent is extended or adjusted under 35 U.S.C. 154(b) by 391 days.

(21) Appl. No.: 17/574,762

(22) Filed: Jan. 13, 2022

(65) Prior Publication Data
US 2022/0225142 A1 Jul. 14, 2022

(30) Foreign Application Priority Data

Jan. 13, 2021 (CN) .......................... 202110042720.4
May 17, 2021 (CN) .......................... 202110536063.9
Sep. 29, 2021 (CN) .......................... 202111153898.2
Dec. 22, 2021 (CN) .......................... 202111581448.3

(51) Int. Cl.
*H04W 24/10* (2009.01)
*H04W 4/20* (2018.01)
*H04W 36/00* (2009.01)

(52) U.S. Cl.
CPC ............. *H04W 24/10* (2013.01); *H04W 4/20* (2013.01); *H04W 36/0058* (2018.08)

(58) Field of Classification Search
CPC ... H04W 24/10; H04W 4/20; H04W 36/0058; H04W 24/08; H04W 36/0085; H04W 76/11; H04L 41/5067; H04L 43/0888
See application file for complete search history.

(56) References Cited

U.S. PATENT DOCUMENTS 9,241,282 B2 * 1/2016 Schmidt ................ H04W 24/08
9,264,928 B2 * 2/2016 Liu ....................... H04W 24/10
9,525,965 B2 * 12/2016 Gunnarsson .......... H04W 4/029
(Continued)

FOREIGN PATENT DOCUMENTS

CN         107534887 B  *  2/2021   ........... H04L 65/608
WO   WO-2013108819 A1 *  7/2013   ......... H04L 43/0888
(Continued)

OTHER PUBLICATIONS

3GPP, 3rd Generation Partnership Project; Technical Specification Group Radio Access Network; NG-RAN; NG Application Protocol (NGAP) (Release 16, 3GPP TS 38.413 V16.4.0, Jan. 2021, 470 pages.
(Continued)

*Primary Examiner* — Jay P Patel
(74) *Attorney, Agent, or Firm* — The Farrell Law Firm, P.C.

(57) ABSTRACT

A measurement method is provided herein, which includes a first node transmitting a first message to a second node. The first message includes configuration related to a second measurement for assisting a first measurement. The second node starts the second measurement according to the configuration related to the second measurement, or obtains information used for aligning the first measurement with the second measurement according to the configuration related to the second measurement.

19 Claims, 17 Drawing Sheets

(56) References Cited

U.S. PATENT DOCUMENTS

| | | | |
|---|---|---|---|
| 9,648,610 B2* | 5/2017 | Chai | H04W 72/27 |
| 10,341,895 B2* | 7/2019 | Zhu | H04L 65/80 |
| 10,454,804 B2* | 10/2019 | Jain | H04L 47/2441 |
| 11,272,388 B2* | 3/2022 | Eklöf | H04W 64/003 |
| 11,956,506 B2* | 4/2024 | Gairuboina | H04N 21/4424 |
| 2011/0269402 A1 | 11/2011 | Yi et al. | |
| 2012/0252487 A1* | 10/2012 | Siomina | H04W 24/10 455/456.1 |
| 2013/0114446 A1* | 5/2013 | Liu | H04W 24/10 370/252 |
| 2014/0087716 A1* | 3/2014 | Vaderna | H04W 24/08 455/422.1 |
| 2014/0179345 A1* | 6/2014 | Gunnarsson | H04W 4/029 455/456.1 |
| 2015/0109939 A1* | 4/2015 | Schmidt | H04W 24/10 370/252 |
| 2015/0156658 A1* | 6/2015 | Zhang | H04W 24/10 370/252 |
| 2015/0281990 A1* | 10/2015 | Kelley | H04W 24/10 370/241 |
| 2015/0373573 A1 | 12/2015 | Lee et al. | |
| 2017/0134980 A1 | 5/2017 | Persson et al. | |
| 2017/0237643 A1 | 8/2017 | Yi et al. | |
| 2018/0041913 A1* | 2/2018 | Zhu | H04L 65/65 |
| 2020/0022034 A1* | 1/2020 | Shi | H04W 36/0044 |
| 2020/0145865 A1* | 5/2020 | Eklöf | H04W 24/10 |
| 2020/0280498 A1* | 9/2020 | Eklöf | H04L 65/80 |
| 2020/0413275 A1* | 12/2020 | Eklöf | H04W 24/10 |
| 2020/0413301 A1* | 12/2020 | Shi | H04L 5/0055 |
| 2021/0377753 A1* | 12/2021 | Li | H04W 24/02 |
| 2021/0385691 A1* | 12/2021 | Johansson | H04W 28/24 |
| 2022/0046503 A1* | 2/2022 | Kumar | H04W 36/0044 |
| 2022/0070709 A1* | 3/2022 | Kumar | H04W 24/08 |
| 2022/0116814 A1* | 4/2022 | Di Girolamo | H04W 4/027 |
| 2022/0210031 A1* | 6/2022 | Hu | H04L 41/0806 |
| 2022/0322154 A1* | 10/2022 | Liu | H04W 28/06 |
| 2022/0330051 A1* | 10/2022 | Peng | H04W 64/006 |
| 2022/0330071 A1* | 10/2022 | Li | H04L 43/0817 |
| 2022/0386166 A1* | 12/2022 | Sarker | H04L 69/164 |
| 2023/0156767 A1* | 5/2023 | Hu | H04W 24/02 370/329 |
| 2023/0216751 A1* | 7/2023 | Barac | H04L 45/24 455/423 |
| 2023/0231779 A1* | 7/2023 | Centonza | H04W 24/10 370/252 |
| 2023/0284058 A1* | 9/2023 | Eklöf | H04W 24/08 370/252 |
| 2023/0292166 A1* | 9/2023 | Centonza | H04W 24/08 |
| 2023/0318941 A1* | 10/2023 | Rune | H04L 41/5009 370/252 |
| 2023/0319616 A1* | 10/2023 | Lunardi | H04W 28/0289 370/329 |
| 2023/0388829 A1* | 11/2023 | Eklöf | H04L 41/0895 |
| 2023/0388830 A1* | 11/2023 | Eklöf | H04W 36/0085 |
| 2023/0403590 A1* | 12/2023 | Rune | H04W 24/08 |
| 2024/0015550 A1* | 1/2024 | Parichehrehteroujeni | H04W 24/08 |
| 2024/0031832 A1* | 1/2024 | Parichehrehteroujeni | H04W 24/10 |
| 2024/0064530 A1* | 2/2024 | Parichehrehteroujeni | H04W 24/08 |

FOREIGN PATENT DOCUMENTS

| | | | | |
|---|---|---|---|---|
| WO | WO-2016163820 A1 | * | 10/2016 | H04W 28/16 |
| WO | WO-2018142345 A1 | * | 8/2018 | |
| WO | WO-2019106055 A1 | * | 6/2019 | H04L 41/0803 |
| WO | WO-2020172491 A1 | * | 8/2020 | H04L 41/5009 |
| WO | WO-2022082727 A1 | * | 4/2022 | |

OTHER PUBLICATIONS

International Search Report dated Apr. 18, 2022 issued in counterpart application No. PCT/KR2022/000666, 9 pages.

3GPP TS 28.405 V16.0.0, 3rd Generation Partnership Project; Technical Specification Group Services and System Aspects; Telecommunication Management; Quality Of Experience (QoE) Measurement Collection; Control and Configuration (Release 16), Jul. 2020, 16 pages.

Ericsson, 3GPP TSG RAN #90-e, Status Report RAN WG3, RP-202129, Dec. 7-11, 2020, 31 pages.

Huawei et al., "TP on the Radio Related Measurements and Information as Assistance to the NR QoE Management Functionality", R3-207118 was R3-206733, 3GPP TSG-RAN WG2 Meeting #110-e, Nov. 2-12, 2020, 2 pages.

European Search Report dated Jun. 11, 2024 issued in counterpart application No. 22739726.2-1215, 13 pages.

* cited by examiner

MEASUREMENT METHOD AND DEVICE

CROSS REFERENCE TO RELATED APPLICATION

This application is based on and claims priority under 35 U.S.C. § 119 to Chinese Patent Application Nos. 202110042720.4, 202110536063.9, 202111153898.2, and 202111581448.3, which were filed in the State Intellectual Property Office (SIPO) of the People's Republic of China on Jan. 13, 2021, May 17, 2021, Sep. 29, 2021, and Dec. 22, 2021, respectively, the entire disclosure of each of which is incorporated herein by reference.

BACKGROUND

1. Field

The disclosure relates generally to wireless communication, and more particularly, to a measurement method and device.

2. Description of Related Art

To meet the increasing demand for wireless data traffic since deployment of 4th generation (4G) communication systems, efforts have been made to develop an improved 5th generation (5G) or pre-5G communication system, which may also be referred to as a 'beyond 4G network' or a 'post long term evolution (LTE) system'. The 5G communication system is intended to be implemented in higher frequency (mmWave) bands, e.g., 60 GHz bands, to accomplish higher data rates.

To decrease propagation loss of the radio waves and increase the transmission distance, beamforming, massive multiple-input multiple-output (MIMO), full dimensional MIMO (FD-MIMO), array antennas, analog beamforming, and large scale antenna techniques are discussed with respect to 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) have been developed for advanced coding modulation (ACM), and filter bank multi carrier (FBMC), non-orthogonal multiple access (NOMA), and sparse code multiple access (SCMA) have been developed as advanced access technologies.

The Internet is evolving to the Internet of things (IoT) wherein distributed entities, i.e., things, exchange and process information without human intervention. The Internet of everything (IoE), which is a combination of the IoT technology and the big data processing technology through connection with a cloud server, has also emerged.

As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), etc., have been recently researched. Such an IoT environment may provide intelligent Internet technology services that collect and analyze data generated among connected things. IoT may be applied to a variety of fields including smart homes, smart buildings, smart cities, smart cars or connected cars, smart grids, health care, smart appliances, and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas.

Application of a cloud RAN as the above-described big data processing technology may also be considered to be as an example of convergence between the 5G technology and the IoT technology.

As described above, various services may be provided according to the development of a wireless communication system, and thus a method for easily providing such services is required.

SUMMARY

In accordance with an aspect of the disclosure, a measurement method is provided, which includes a first node or a third node transmits a first message to a second node, wherein the first message comprises configuration related to a second measurement, and the second measurement is used for assisting a first measurement; and the second node starts the second measurement according to the configuration related to the second measurement, or, obtains information used for aligning the first measurement with the second measurement according to the configuration related to the second measurement.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
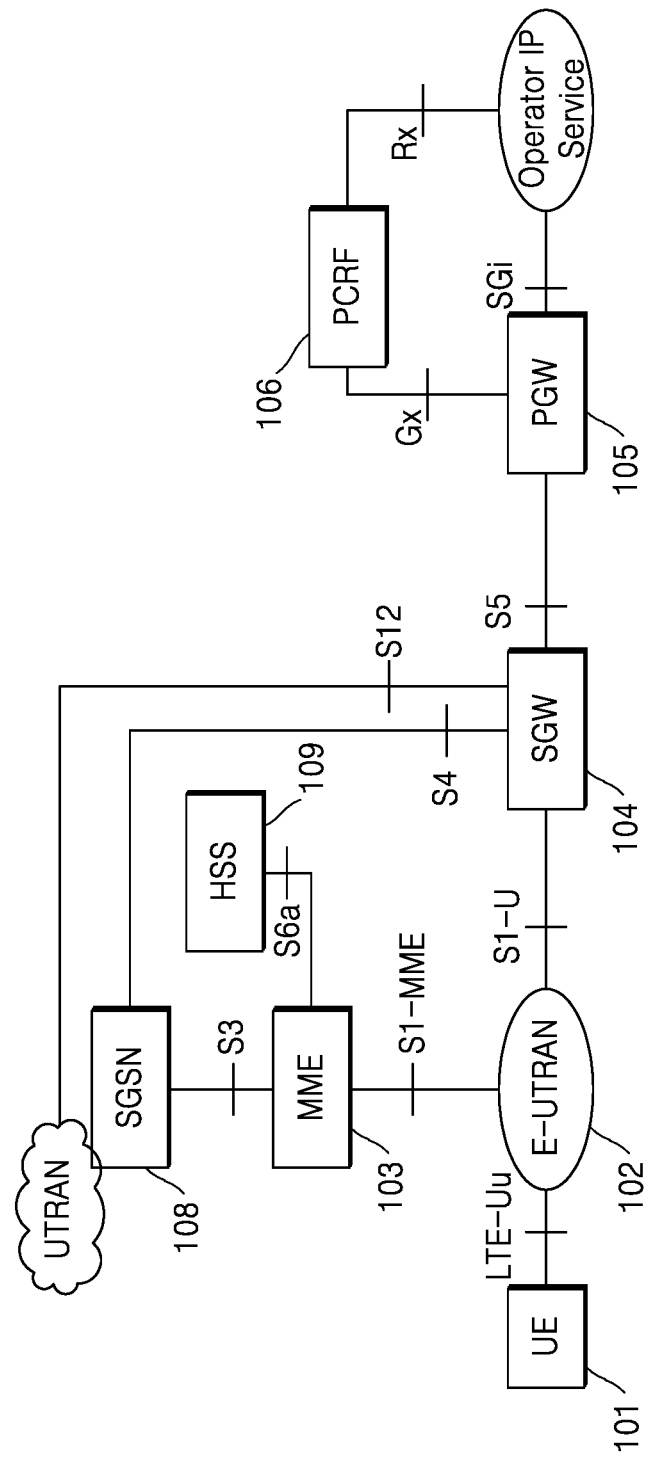
FIG. 1 illustrates architecture of system architecture evolution (SAE)

Various embodiments and the various features of the disclosure and advantageous details thereof are explained more fully below with reference to the non-limiting embodiments that are illustrated in the accompanying drawings. Descriptions of well-known components and processing techniques are omitted so as to avoid obscuring the embodiments of the disclosure. Further, the examples used herein are intended merely to facilitate an understanding of ways in which the embodiments herein may be practiced and to further enable those of skill in the art to practice the embodiments of the disclosure. Accordingly, the examples herein should not be construed as limiting the scope of the embodiments of the disclosure.

In the following descriptions, expressions such as "activate", "deactivate", "start", or "end" are used only for convenience. As such, it should be understood that when the expression "activate" is used in the embodiments, other expressions such as "start" may also be used unless otherwise clearly stated in the context, and vice versa. In addition, when the expression "deactivation" is used to describe the embodiments, similar expressions such as "end" or "stop" may also be used, and vice versa.

In addition, "/" means "or" herein.

In accordance with an embodiment of the disclosure, a measurement method is provided for being performed by a second node. The measurement method may include receiving a first message from a first node, wherein the first message includes a configuration related to a second measurement, and the second measurement is used for assisting a first measurement; starting the second measurement according to the configuration related to the second measurement, or obtaining information used for aligning the first measurement and the second measurement according to the configuration related to the second measurement.

The configuration related to the second measurement may include at least one of an indication for indicating to the second node whether the first measurement is started; an indication for indicating to the second node whether the first measurement is ended; an indication for indicating the second node not to start the second measurement; reference information of the first measurement for identifying a measurement job identifier (ID) corresponding to the first measurement; a recording session ID of the first measurement for indicating a recording session identification in which the first measurement is ongoing; bearer information for indicating to the second node bearers to be measured; period time information for indicating to the second node a time or a manner for generating a second measurement report; measurement configuration information for indicating a content to be measured by the second node; QoE degradation or quality improvement indication for indicating that a user experience in an application layer is getting worse or better; a second measurement start/end indication for indicating the second node to start/end the second measurement; information used for indicating a mapping relationship between a first measurement ID and a second measurement ID; and reporting pausing time of the first measurement.

The measurement configuration information may include one or more of a number of active users in a cell, a base station load, a cell load, a physical resource block (PRB) load, a base station/cell alarm, a number of error transmission blocks (TBs) corresponding to UE, channel quality indicator (CQI) distribution or modulation and coding scheme (MCS) distribution, utilization rates of network slice resources, throughputs, or a number of users.

The measurement method may further include receiving a first indication transmitted by the first node or a third node for activating the second measurement; and starting the second measurement according to the first indication, or monitoring bearers corresponding to the first measurement according to information in the first indication, and starting or ending the second measurement according to a monitoring result.

The first indication may include at least one of a recording session ID of the first measurement, start time of the first measurement, a period of the first measurement, a period time indication, data radio bearer (DRB) information, QoS flow ID, a QoS level indication, reference information of the first measurement, a recording session start indication of the first measurement, a start indication, an activation indication, and a QoE degradation indication.

The measurement method may further include receiving a second indication transmitted by the first node or a third node for ending or deactivating the second measurement; and ending the second measurement according to the second indication.

The second indication may include at least one of a recording session ID of the first measurement, reference information of the first measurement, a recording session end indication of the first measurement, an end indication, a deactivation indication and a QoE quality improvement indication.

The second node may be a user equipment (UE), and the method may further include transmitting an indication for starting (or activating) or ending (or deactivating) the second measurement from an application layer of the UE to an access stratum of the UE, and starting or ending the second measurement by the UE according to the indication.

The second node may be a second base station, and the configuration related to the second measurement may include the configuration related to the second measurement of the first node.

The configuration related to the second measurement may include third indication information indicating whether the first node has activated the second measurement, and the method may further include starting the second measurement according to the third indication information.

The first message may include a handover request message or a retrieve UE context response message.

The first message may further include configuration related to the first measurement, and the configuration related to the first measurement includes one or more of the following information: information for requesting to transmit a start or end indication of the first measurement; information for requesting a period of the first measurement; information for requesting reference information indicating the first measurement; information for requesting a recording session ID; information for requesting a DRB; information for requesting a quality of service (QoS) identification; information for requesting a QoS level; and information for requesting reporting pausing time.

The first message may be an initial context setup request message or a trace start message.

The measurement method may further include transmitting a report of the first measurement and/or a report of the second measurement to a fourth node.

The report of the second measurement may include one or more of a node ID for indicating a node performing the second measurement; measurement time for indicating time when the second measurement is performed; reference information of the first measurement; a recording session ID of the first measurement; and a result of the second measurement.

The first measurement may be a QoE measurement, and the second measurement may be a minimization drive test (MDT) measurement.

The first measurement may be a QoE measurement, and the second measurement may be an operation for evaluating a result of the first measurement, i.e., the operation for evaluating the result of the QoE measurement.

In accordance with an aspect of the disclosure, a measurement method is provided for being performed by a first node. The measurement method may include transmitting a first message to a second node, wherein the first message includes a configuration related to a second measurement, and the second measurement is used for assisting a first measurement.

The configuration related to the second measurement may include at least one of an indication for indicating to the second node whether the first measurement is started; an indication for indicating to the second node whether the first measurement is ended; an indication for indicating the second node not to start the second measurement immediately; reference information of the first measurement for identifying a measurement job ID corresponding to the first measurement; a recording session ID of the first measurement for indicating a recording session identification in which the first measurement is ongoing; bearer information for indicating to the second node bearers to be measured; period time information for indicating to the second node a time or a manner for generating a second measurement report; measurement configuration information for indicating a content to be measured by the second node; QoE degradation or quality improvement indication for indicating that a user experience in an application layer is getting worse or better; or a second measurement start/end indication for indicating the second node to start/end the second measurement.

The measurement configuration information may include one or more of a number of active users in a cell, a base station load, a cell load, a PRB load, a base station/cell alarm, a number of error TBs corresponding to UE, CQI distribution or MCS distribution, utilization rates of network slice resources, throughputs, or a number of users.

The measurement method may further include transmitting a first indication for activating the second measurement to the second node.

The first indication may include at least one of a recording session ID of the first measurement, a start time of the first measurement, a period of the first measurement, a period time indication, DRB information, a QoS flow ID, a QoS level indication, reference information of the first measurement, a recording session start indication of the first measurement, a start indication, an activation indication, or a QoE degradation indication.

The measurement method may further include transmitting a second indication for deactivating the second measurement to the second node.

The second indication may include at least one of a recording session ID of the first measurement, reference information of the first measurement, a recording session end indication of the first measurement, an end indication, a deactivation indication, and a QoE quality improvement indication.

The first node may be a first base station, and the configuration related to the second measurement may include the configuration related to the second measurement of the first base station.

The configuration related to the second measurement may include third indication information indicating whether the first node has activated the second measurement.

The first message may include a handover request message or a retrieve UE context response message.

The first message may include a configuration related to the first measurement, and the configuration related to the first measurement may include one or more of information for requesting to transmit a start or end indication of the first measurement; information for requesting a period of the first measurement; information for requesting reference information indicating the first measurement; information for requesting a recording session ID; information for requesting a DRB; information for requesting a QoS identification; or information for requesting a QoS level.

The first message may be an initial context setup request message or a trace start message.

The measurement method may further include transmitting a report of the first measurement and/or a report of the second measurement to the second node or the third node or a fourth node, and the report of the second measurement may include one or more of a node ID for indicating a node performing the second measurement; measurement time for indicating time when the second measurement is performed; reference information of the first measurement; a recording session ID of the first measurement; or a result of the second measurement.

The first measurement may be a QoE measurement, and the second measurement may be an MDT measurement.

In accordance with another aspect of the disclosure, a first node is provided. The first node may include a transceiver configured to receive and transmit signals; a memory configured to store a computer program and related data; and a processor configured to execute the computer program to implement one of the methods according to various embodiments of the disclosure.

In accordance with another aspect of the disclosure, a second node is provided. The second node may include a transceiver configured to receive and transmit signals; a memory configured to store a computer program and related data; and a processor configured to execute the computer program to implement one of the methods according to various embodiments of the disclosure.

Wireless communication is one of the most successful innovations in modern history. Recently, a number of subscribers of wireless communication services has exceeded 5 billion, and it continues growing rapidly. With the increasing popularity of smart phones and other mobile data devices (such as tablet computers, notebook computers, netbooks, e-book readers and machine-type devices) in consumers and enterprises, a demand for wireless data services is growing rapidly. In order to meet rapid growth of mobile data services and support new applications and deployments, it is very important to improve efficiency and coverage of wireless interfaces.

FIG. 1 illustrates architecture of SAE.

Referring to FIG. 1, a UE 101 is a terminal device for receiving data. An evolved universal terrestrial RAN (E-UTRAN) 102 includes a macro base station (e.g., an eNodeB/NodeB) that provides UE 101 with interfaces to access the radio network. A mobility management entity (MME) 103 manages mobility context, session context, and security information of the UE 101. A serving gateway (SGW) 104 provides functions of user plane, and the MME 103 and the SGW 104 may be in the same physical entity.

A packet data network gateway (PGW) 105 provides functionality for charging, lawful interception, etc., and may be in the same physical entity as the SGW 104. A policy and charging rules function entity (PCRF) 106 provides QoS policies and charging criteria. A serving general packet radio service support node (SGSN) 108 provides routing for data transmission in a universal mobile telecommunications system (UMTS). A home subscriber server (HSS) 109 is a home subsystem of the UE 101, and provides functionality for protecting user information including a current location of the UE, an address of a serving node, user security information, and packet data context of the UE, etc.

Figure 2:
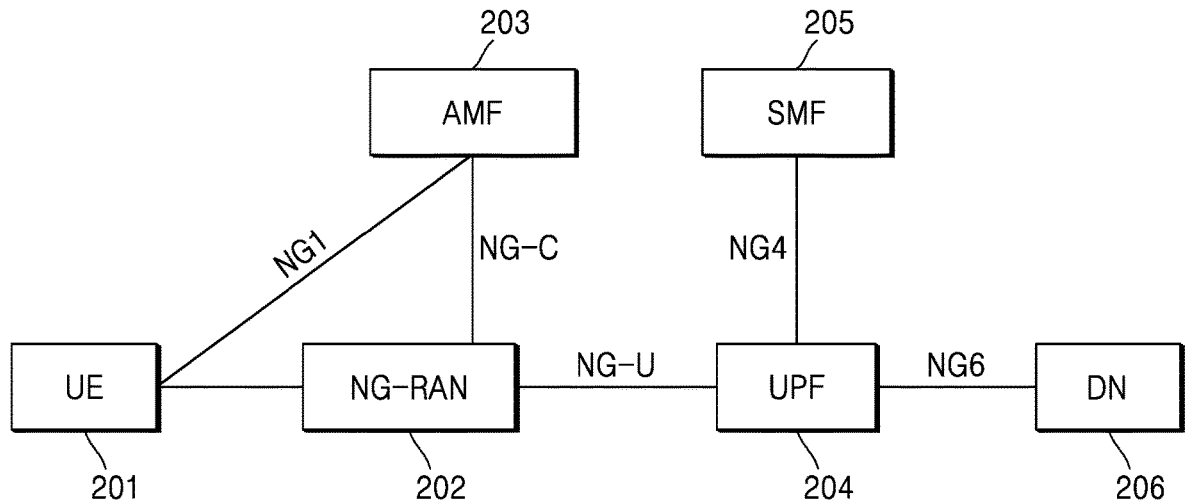
FIG. 2 illustrates system architecture according to an embodiment.

FIG. 2 illustrates system architecture according to an embodiment.

Referring to FIG. 2, a UE 201 is a terminal device for receiving data. A next generation RAN (NG-RAN) 202 includes a base station that provides the UE 201 with interfaces to access the radio network. The base may be a gNB or an eNB connected to a 5G core network, and the eNB connected to a 5G core network may also be referred to as an ng-gNB.

An access control and mobility management function entity (AMF) 203 is responsible for managing mobility context and security information of the UE 201. A user plane function entity (UPF) 204 provides functions of user plane. A session management function entity (SMF) 205 is responsible for session management. A data network (DN) 206 includes, for example, services of operators, Internet access, and service of third parties.

Figure 3:
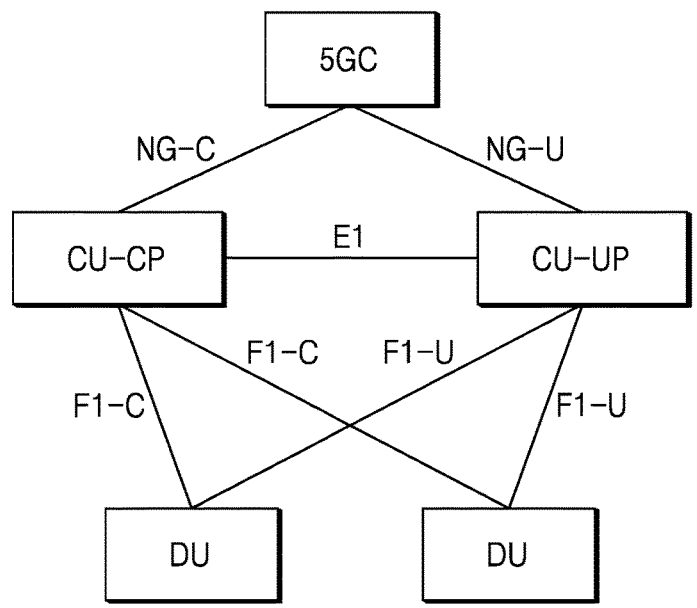
FIG. 3 illustrates 5G architecture according to an embodiment.

FIG. 3 illustrates 5G architecture according to an embodiment.

Referring to FIG. 3, the 5G architecture includes a 5G access network and 5G core network (5GC). The UE communicates with a DN through the access network and the core network.

A central control unit (CU) can be further divided into a control function node (hereinafter referred to as a control plane (CP) node or a CU-CP node) and a user plane function node (hereinafter referred to as a user plane (UP) node or a CU-UP node). A CP node and an UP node may be separate physical nodes. An interface between the CP and the UP is called an E1 interface. There is only control plane between the CP and the UP, while data plane is established among the core network, the UP and a distributed unit (DU). The CP is connected with the core network through NG-C and is connected with the DU through F1-C. The UP is connected with the core network through NG-U and connected with the DUs through F1-U.

In a 3rd generation (3G) and 4G mobile communication systems, QMC for streaming media services and multimedia telephony services has been standardized by the 3rd generation partnership project (3GPP). The QMC can collect measurement information of an application layer of the UE, which may be measured and collected in a certain area or for a specific service or a certain service type of specific UE. The collected information can be transmitted to a data center (e.g., a measurement collector entity (MCE)), and then used to analyze and/or calculate a key performance indictor (KPI), so as to optimize the network and improve the service QoE of users, possibly enhancing user loyalty and increasing earnings.

Figure 4:
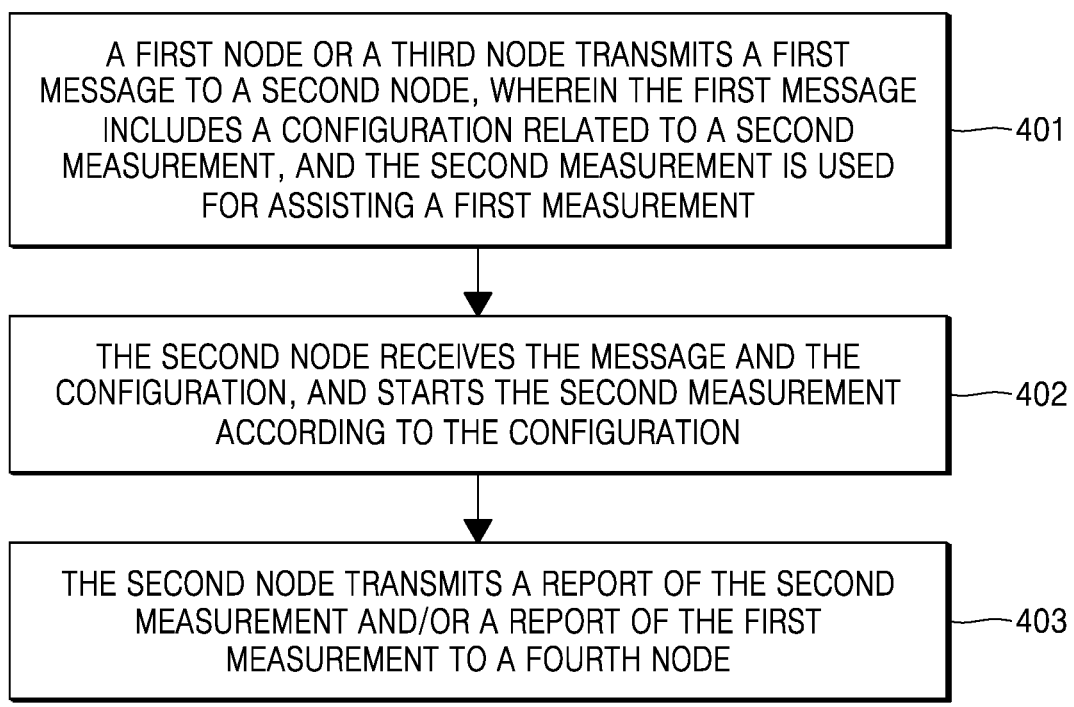
FIG. 4 illustrates a quality of experience (QoE) measurement collection (QMC) configuration and reporting process according to an embodiment.

FIG. 4 illustrates a QMC configuration and reporting process according to an embodiment.

Referring to FIG. 4, in step 401, a first node or a third node transmits a first message to a second node. The first message includes a configuration related to a second measurement, and the second measurement is used for assisting a first measurement. The assisting the first measurement may be assisting the management of the first measurement, which may refer to helping the network to further analyze, evaluate, or improve the results of the first measurement, or helping or assisting in analyzing the problems reflected by the first measurement. The first measurement may be the first measurement performed by the UE, or the first measurement performed by the base station or other nodes, and the device performing the first measurement is not limited in this disclosure. For example, the first measurement may be an application layer measurement or a QoE measurement. The second measurement may be a radio-related measurement, which may be a measurement on a node serving the UE and/or a measurement on an access stratum of the UE. The second measurement may be an MDT measurement.

The configuration related to the second measurement may include at least one of:

a first indication for indicating, to the second node, whether the first measurement is started;

a second indication for indicating, to the second node, whether the first measurement is ended;

a third indication for indicating, to the second node, not to start the second measurement after receiving configuration content for the second measurement. The second node should save the configuration content and decide whether to start the second measurement according to the first indication or the second indication;

reference information of the first measurement for identifying a measurement job ID corresponding to the first measurement, which can be an application layer reference, a QoE reference or a QMC reference;

a recording session ID of the first measurement for indicating a recording session identification in which the first measurement is ongoing, so that the second node includes the ID in the report of the second measurement and transmits it to the fourth node. The fourth node may be a server for analyzing network data, such as a QoE server, a trace collection entity (TCE), an MCE, an operation and maintenance management (OAM) entity, etc.;

bearer information for indicating, to the second node, which bearer or bearers to be measured if the second measurement starts. The bearer information may be a DRB list used in the second measurement, a QoS flow ID, or a QoS level, and other information;

period time information for indicating how the second node should generate the second measurement report, for example, for indicating, to the second node, when or at what time interval to generate the second measurement report, and/or when to transmit the second measurement report, etc.;

measurement configuration information for indicating which content should be measured or collected by the second node, which can include one or more of: a number of active users in a cell, a base station load, a cell load, a PRB load, a base station/cell alarm, a number of error TBs corresponding to the UE, CQI distribution or MCS distribution, utilization rates of network slice resources, throughputs, or a number of users;

a QoE degradation/quality improvement indication for indicating that user experience in an application layer is getting worse or better, so that the second node decides whether to start the second measurement. The indication can be a simple indication, such as an indication describing "degradation" or "quality improvement", or a specific QoE score, such as a mean subjective opinion score (MOS) value, or a certain QoE metric, such as the number of times video is stuck, or one or more specific indication bits or flags, such as "0" indicating quality reduction or degradation, and "1" indicating quality improvement;

a second measurement start/end indication for indicating, to the second node, to start/end the second measurement; and a second measurement description indication, such as an assistance MDT indication, for indicating, to the second node not to start measurement immediately after receiving the second measurement configuration.

The first node, the second node, and the third node may be an OAM, a core network node, a base station, a CU, a CU-CP, a CU-UP, a DU, or a UE.

For example, the first node, the second node, and the third node may have the following situations:

If the first node is a core network node, e.g., the core network node is an AMF, and the second node is a base station, the first message may be an initial context setup request message, a trace start message, or a handover request message;

If both the first node and the second node are base stations, the first message may be a handover request message, a secondary node addition request message, a retrieve UE context response message, a trace start message, etc.;

If the first node is a CU-CP, the second node may be a CU-UP, and the first message may be a bearer context setup request message or a trace start message;

If the first node is a CU, the second node may be a DU, and the first message may be a UE context setup request message or a trace start message;

If the first node is a base station and the second node may be a UE, the first message may be a radio resource control (RRC) message, e.g., an RRC reconfiguration message; and If the third node is a UE and the second node is a base station, the first message may be an RRC message, e.g., a MeasReportAppLayer message.

In step 402, the second node may start the second measurement according to the configuration related to the second measurement, and may generate a report of the second measurement according to the configuration related to the second measurement. The report of the second measurement may be an MDT report, an assistance MDT report, a trace report, or other forms of reports, which are used to report the result of the second measurement according to the period time information in the configuration. The report may be reported to a fourth node, which may be a server for analyzing network data, such as a QoE server, a TCE, an MCE, an OAM, etc.

According to the third indication in the configuration related to the second measurement, the second node can decide that the second measurement is related to the first measurement, and the starting and ending of the second measurement should be related to the correlated first measurement, so that the second node will decide to start or end the second measurement according to the first indication or the second indication. According to the reference information of the first measurement, the second node decides which first measurement or measurements corresponding to the second measurement are to be started or ended, and adds the reference information and the recording session ID of the first measurement to the report of the second measurement, so that the data processing center can correlate the report of the first measurement with the report of the second measurement.

According to the bearer information, the second node may measure the bearer related to the first measurement when performing the second measurement. The second node can use the period time information to ensure that the report of the first measurement and the report of the second measurement can be aligned or basically aligned in time, e.g., during the process of UE handover, which is beneficial for the data processing center to further correlate the report of the first measurement with the report of the second measurement. The second node measures or collects the indicated information according to the measurement configuration information included in the configuration related to the second measurement, which is beneficial to further conduct a more targeted optimization analysis.

In step 403, the second node generates a report of the second measurement according to the configuration related to the second measurement, and adds one or more of the following information to the report of the second measurement:

a node ID, which is used to indicate a node performing the second measurement, e.g., a base station ID;

measurement time, which indicates the time when the node performs the second measurement, e.g., a start timestamp and/or an end timestamp;

reference information of the first measurement, which is used to identify the measurement job ID corresponding to the first measurement, e.g., an application layer reference, a QoE reference, or a QMC reference;

a recording session ID of the first measurement, which is used to indicate a recording session identification in which the first measurement is ongoing, so that the second node can include the ID in the report of the second measurement and transmit it to the fourth node, so that the fourth node can correlate the report of the second measurement with the report of the first measurement corresponding to the recording session ID. The fourth node may be a server for analyzing network data, such as a QoE server, a TCE, an MCE, an OAM, etc.; or a second measurement result which indicates a result of the second measurement performed by the node.

The second node transmits the report of the second measurement to the fourth node, which may be the same as or different from the first node.

If the fourth node is different than the first node, the fourth node may be a server for analyzing network data, such as a QoE server, a TCE, an MCE, an OAM, etc.

If the fourth node is the same as the first node, and the fourth node receives the report of the first measurement, the fourth node may transmit the report of the first measurement and/or the report of the second measurement to a fifth node (e.g., a server for analyzing network data).

Possible cases of the second node and the fourth node may include:

If the second node is a DU, the fourth node is a CU;
If the second node is a CU-UP, the fourth node is a CU-CP;
If the second node is a secondary base station, the fourth node is a master base station;
If the second node is a source base station, the fourth node is a target base station; and
If the second node is a UE, the fourth node is a base station.

If the fourth node is the same as the first node, if the second node is a UE and the fourth node is a base station, the UE may transmit a report of the first measurement and/or a report of the second measurement to the fourth node.

In this method, the second node may measure or collect the indicated information according to the measurement configuration information included in the configuration related to the second measurement, which is beneficial to further conduct a more targeted optimization analysis.

For example, in the case of an area-based QoE measurement, which is one measurement type of the first measurement, cell-level measurement configuration, such as a number of active users, a base station load and a radio resource load, etc., is added in the configuration related to the second measurement, which can help to further analyze the reasons of QoE degradation in the area. For example, the cell-level measurement configuration can be used to determine whether the QoE degradation is caused by too many users or insufficient resources.

In case of a QoE measurement for a specific UE, more detailed measurement configuration for UE-related measurement, such as the number of wrong TBs, a CQI distribution, an MCS distribution, etc., may be added to the configuration related to the second measurement, which can facilitate further analysis of the reasons for QoE degradation. For example, the more detailed measurement configuration for the UE-related measurement can be used to determine whether the degradation is caused by poor wireless environment of users or unreasonable scheduling of base stations.

In the case of a QoE measurement for a specific network slice, the measurement configuration for a network slice related measurement, such as a resource utilization rate of the network slice, an average throughput and a number of users on the network slice, etc., may be added to the configuration related to the second measurement, which can facilitate further analysis of the reasons for QoE degradation. For example, the measurement configuration for the network slice related measurement can be used to determine whether the degradation is caused by unreasonable resource allocation of the network slice.

When multiple nodes are involved in the second measurement corresponding to one first measurement report, the node receiving the first measurement report can include second measurement reports on the multiple nodes in the first measurement report, and transmit the first measurement report and the second measurement report list to the server together, so as to correlate the two measurement reports more quickly and optimize the network more quickly.

The first measurement may be an application layer measurement, and the second measurement may be a radio related measurement. The application layer measurement can be a QoE measurement or a QMC measurement, and the second measurement can be an MDT measurement, an assistance MDT measurement, a trace measurement, etc. However, the disclosure is not limited to these examples.

Hereinafter, for the purpose of conciseness of description or facilitating better understanding of the scheme of the present disclosure, description will be made by using a QoE measurement as the first measurement, and an MDT measurement or an assistance MDT measurement as the second measurement. However, the following description does not limit the first measurement to the QoE measurement, nor does it limit the second measurement to the MDT measurement or the assistance MDT measurement.

In addition, the names of some terms in this disclosure can also use other names. For example, the "assistance MDT configuration" can also be referred to as an "assistance MDT measurement configuration" or similar names, and "assistance MDT report" can also be referred to as "assistance MDT measurement report", "MDT report", or similar names. All these modifications and changes belong to the scope of this disclosure.

As described above, a measurement configuration and reporting method for assisting QoE optimization can ensure that during QoE measurement collection, the network node or a UE performing assistance measurement (e.g., the second measurement for assisting QoE measurement) and the QoE measurement of the application layer are configured to start at the same time and proceed synchronously, and through the provided correlated information, the operator can correlate a QoE measurement and assistance measurement results faster and more accurately in any scene, so as to analyze QoE problems accurately and quickly, thereby optimizing the network and improving the user experience. The above-described method can also make the assistance measurement process and object more targeted, and reduce unnecessary measurement overhead and measurement redundancy, thereby improving the utilization rate of measurement information and saving network resources.

In accordance with an aspect of the disclosure, a measurement configuration and reporting method or device for assisting management of an application layer measurement (e.g., for assisting QoE optimization) can also help operators to obtain assistance measurement information corresponding to application layer measurement while collecting service QoE or during collection. Operators can use the measurement results of assistance measurement for assisting the management of an application layer measurement to analyze the reasons for QoE deterioration faster and more accurately, thereby optimizing the network more accurately, improving the service QoE of users, and possibly enhancing user loyalty and increasing operator revenue.

The various measurement configurations and reporting methods provided by this disclosure are not limited to only QoE measurement, but may also be applied to other application layer measurements, so as to assist other application layer measurements and optimize other application layer measurements. However, for the sake of brevity, hereinafter, QoE measurements or QMC will be described as an example of application layer measurement.

The QoE measurement herein can also be referred to as QMC, which refers to QoE measurement configured by a 3GPP network and performed by a UE. The measurement results may be reported to the 3GPP network or the operator server.

According to an initiation mode, the QMC may be divided into management-based QMC and signaling-based QMC. The QMC can be initiated by a network element management node, and this type of QMC is called management-based QMC. In the management-based QMC, an access network entity receives a QMC configuration message from a network element management node.

QMC can also be initiated by a core network entity, and this type of QMC is called signaling-based QMC. In the signaling-based QMC, an access network entity receives a QMC configuration message from the core network entity. The core network entity may be, an AMF or may be another node (such as a base station).

Figure 5:
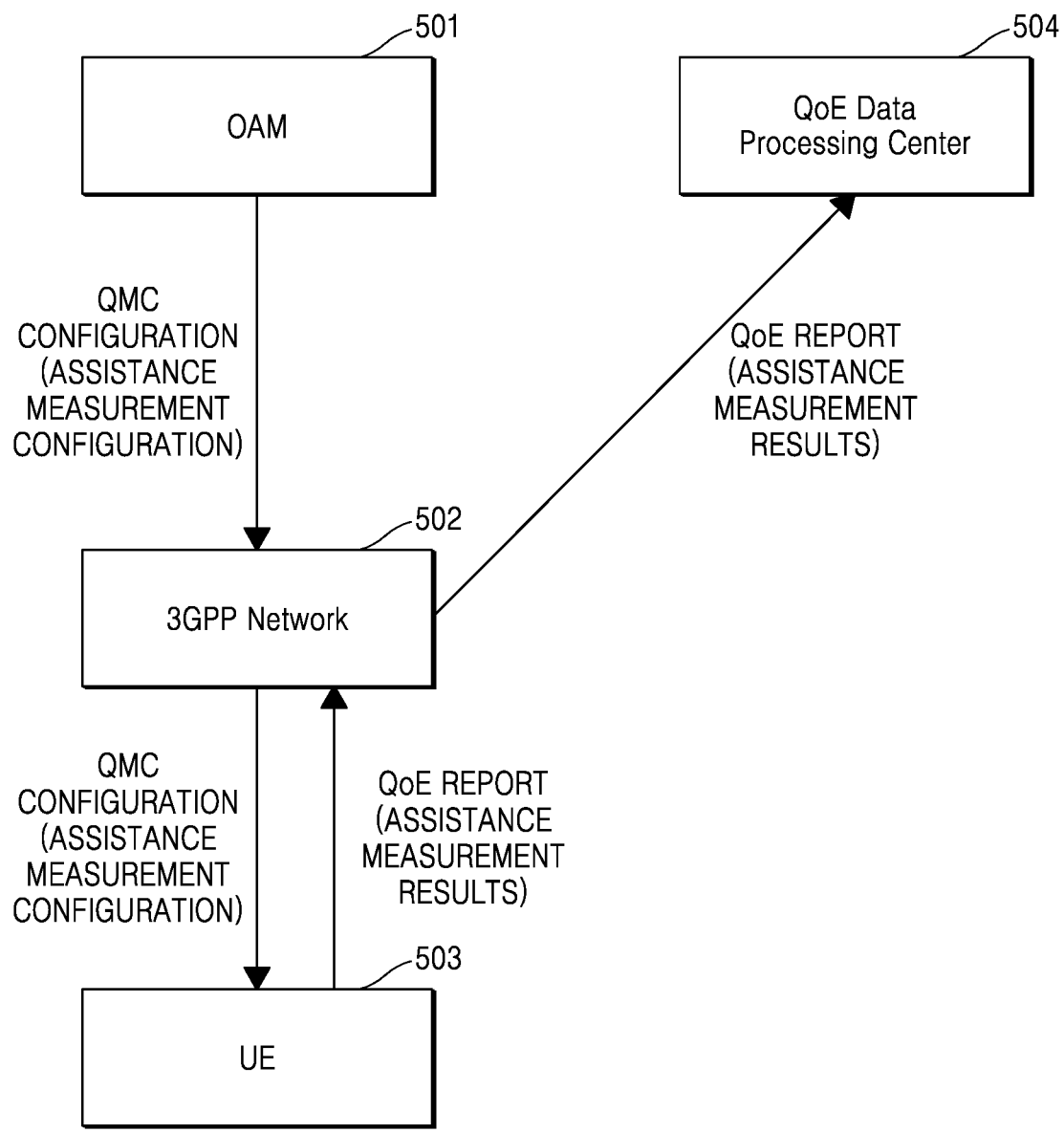
FIG. 5 illustrates a configuration and reporting process of a measurement method according to an embodiment.

FIG. 5 illustrates a configuration and reporting process of a measurement method according to an embodiment.

Referring to FIG. 5, an OAM 501 transmits a QMC configuration message to a 3GPP network 502. The 3GPP network 502 includes a core network node or an access network node. A core network node may include unified data management (UDM), AMF, SMF, or UPF nodes, etc. The access network node may be an eNB of a 4G system, a gNB or an eNB of a 5G system, or a base station of other systems. The QMC configuration message includes QMC configuration information and/or assistance measurement configuration information. Assistance measurement configuration refers to that when the UE application layer measures QoE, the nodes in the 3GPP network and/or the UE access stratum also make correlated assistance measurements at the same time to assist or help the evaluation and improvement of QoE and the optimization analysis of QoE problems. The correlated assistance measurement refers to the assistance measurement that should be consistent or aligned with the application layer measurement in time.

Alternatively, the UE application layer measurement QoE and the correlated assistance measurement do not have to be performed strictly at the same time, but a certain time offset can be allowed. In some embodiments, the correlated assistance measurement is consistent with or roughly aligned with the application layer measurement in time, which can allow a certain time offset, as long as the node processing the received assistance measurement report and the QMC report can correctly match the corresponding correlated assistance measurement report of the QMC report within the range of the offset.

Based on the description above, it should be understood that expressions such as "simultaneous", "consistent in time", "aligned in time", etc., as used throughout the disclosure, do not exclude the existence of a certain offset in time.

The 3GPP network 502 can initiate the activation of the QMC process, which can be divided into the management-based QMC and the signaling-based QMC according to different activated nodes. If the activation of QMC is directly triggered by an OAM through the base station, the process belongs to the management-based QMC process. However, if the activation of QMC is triggered by the core network node, the process belongs to signaling-based QMC process. Either way, the 3GPP network 502 will transmit the QMC configuration to a UE meeting a condition. If the QMC configuration includes the configuration of assistance measurement, the assistance measurement configuration may be for network nodes or the UE 503. Nodes configured with assistance measurement should save the configuration information of the assistance measurement and activate the assistance measurement when appropriate.

At the beginning of each service session, the UE 503 determines whether to start a QoE measurement according to the configuration condition. At the same time, nodes configured with the assistance measurement should also carry out correlated assistance measurement.

The UE 503 delivers the measurement results including the QoE report and/or the assistance measurement results to the configured QoE data processing center 504 through the access network node in the 3GPP network 502. For example, the QoE data processing center 504 may be a TCE or an MCE. However, the nodes configured with assistance measurement in 3GPP network 502 should also transmit the results of assistance measurement to the QoE data processing center 504, so that operators can make further analysis on the QoE problem and make network optimization.

Figure 6:
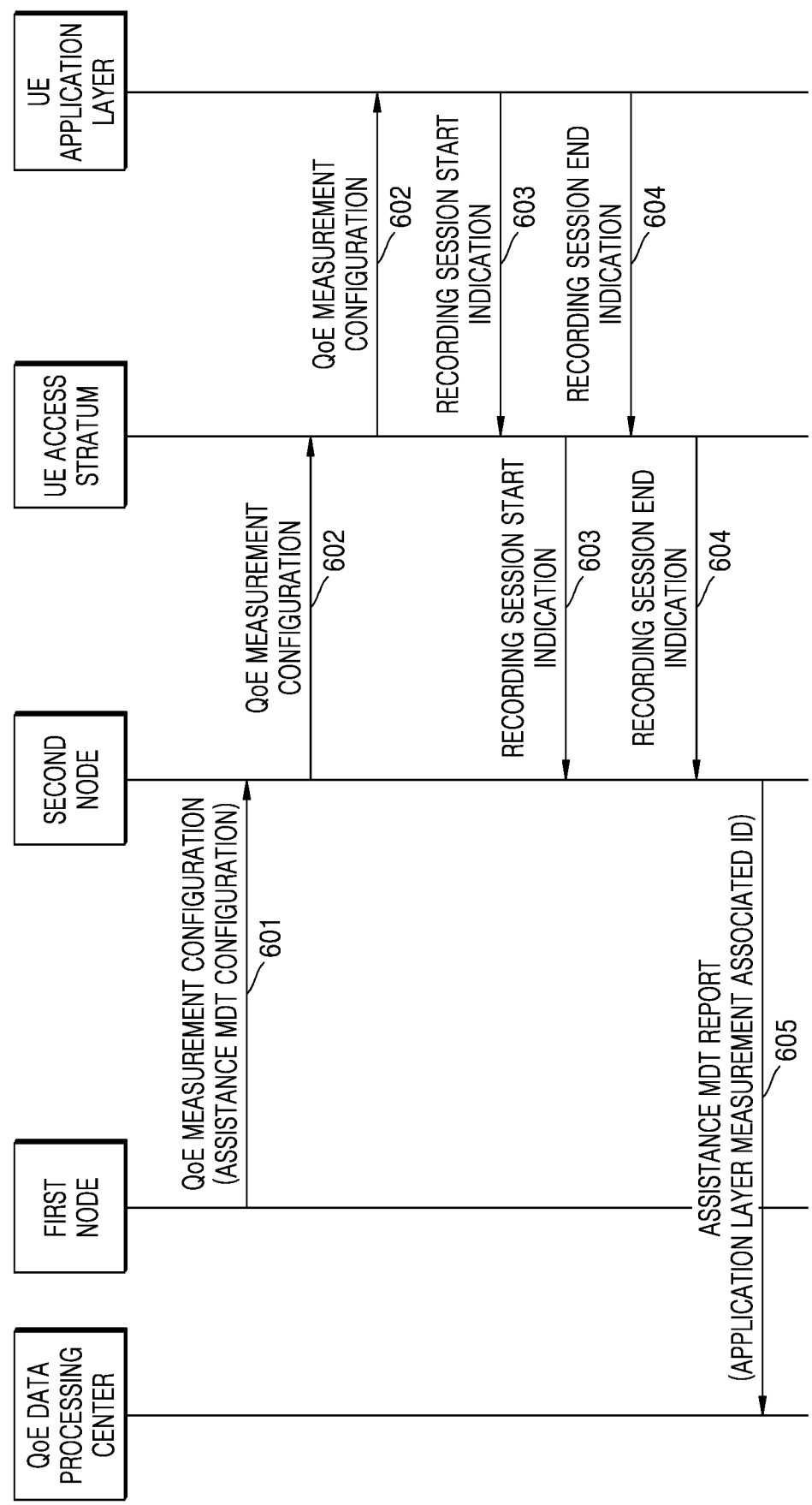
FIG. 6 illustrates a measurement configuration and reporting method for assisting optimization of QoE according to an embodiment.

FIG. 6 illustrates a measurement configuration and reporting method for assisting optimization of QoE according to an embodiment.

Referring to FIG. 6, in step 601, the first node starts the activation of QoE measurement and transmits the QoE measurement configuration to the second node. The first node may be a core network node or an OAM, and the second node may be a gNB or an eNB. The QoE measurement configuration is defined by a UE application layer measurement configuration information element (IE). The UE application layer measurement represents a measurement in a UE application layer, and a QoE measurement is a kind of measurement in the UE application layer. The UE application layer measurement configuration IE may be included in a trace activation IE, which may be included in the first message. If the first node is a core network, the first message may be an initial context setup request message or a trace start message. If the first node is OAM, the first message may be an activation task from the OAM. However, it should be understood that the first message is not limited to these specific examples, but may include other messages for delivering a QoE measurement configuration.

If there are radio-related measurements to assist QoE management analysis, the radio-related measurement configuration may be transmitted with the QoE measurement configuration. The radio-related measurement refers to an assistance measurement for assisting an application layer measurement (e.g., a QoE measurement). The radio-related measurement may be an MDT measurement, an MDT-like measurement, or/and an on-node counter measurement. Since the radio-related measurement can be used to assist QoE analysis to identify QoE degradation problems, the radio-related measurement should be aligned with the corresponding QoE measurement in time, or basically aligned in time as mentioned above. For example, an MDT mechanism can be used to trigger radio-related measurement. If the MDT measurement is used to assist QoE optimization analysis, the MDT measurement can be called an assistance MDT. If an assistance MDT indication is included in the MDT configuration, the second node will not start the MDT session immediately. The activation mode of this MDT configuration may be different from other MDT. For example, two methods are described below, which can be used to distinguish the assistance MDT configuration from other MDT configurations (e.g., an immediate MDT, a logged MDT, etc.), so as to indicate the second node not to start the session for the assistance MDT before receiving the corresponding QoE measurement indication.

Method 1: set an assistance MDT indication in the MDT configuration to indicate that the MDT configuration is an assistance MDT configuration. For example, the assistance MDT indication can be set in the MDT activation IE. The MDT activation IE may be included in the trace activation IE.

If MDT is supported:
  if the trace activation IE includes an MDT activation IE, set to "assistance MDT only" or "assistance MDT", or indicates "assistance MDT only" or "assistance MDT" in other ways (e.g., indicated by one or more bits, flags, etc.), the second node should ignore the interface to trace IE and the trace depth IE, and store the assistance MDT configuration and use it to start or activate the MDT session when appropriate; and
  if the trace activation IE includes an MDT activation IE, set to "assistance MDT and trace" or indicates "assistance MDT and trace" in other ways, the second node should store the assistance MDT configuration and trace configuration, and use it to start/activate the MDT session and trace session when necessary.

The "assistance MDT" can also be "assistance QoE", "assistance UE application layer measurement" or other new descriptions to indicate that this MDT is configured to assist UE application layer measurement analysis.

Method 2: the MDT configuration is included in the UE application layer measurement configuration to implicitly indicate that the MDT configuration is an assistance MDT configuration.

If MDT is supported:
  if a UE application layer measurement configuration IE contains an MDT configuration IE, it implicitly indicates that the MDT configuration is used to assist UE application layer measurement, so the second node should store the MDT configuration and use it to start/activate MDT sessions when appropriate. The MDT configuration may be an assistance MDT configuration, which is correlated with the UE application layer measurement. That is, the assistance MDT configuration is correlated with the measurement job in the application layer measurement configuration, e.g., correlated with the QoE reference in the application layer measurement configuration.

In the assistance MDT configuration of Method 1, the following information may also be included:
  a QoE reference, for indicating which QoE measurement job the assistance MDT measurement is correlated with, so that the second node starts the assistance MDT session correlated with the QoE measurement job. The second node may include the QoE reference into the corresponding assistance MDT report to help the QoE data processing node correlate the QoE report with the assistance MDT report.

To activate or deactivate the radio-related assistance measurement, an indication from the UE is used to activate or deactivate the radio-related assistance measurement on the second node. The indication for activation may be "a recording session start indication", "a start indication", "an activation indication", "a QoE degradation indication", or other indications for activation. The indication for deactivation may be "a recording session end indication", "an end indication", "a deactivation indication", "a QoE improvement indication" or other indications for deactivation.

If there are radio-related measurements to assist QoE management analysis, the QoE measurement configuration may include one or more of the following information:

an indication or a request for informing or requesting the application layer to transmit a start/end indication of each recording session;

a request to the application layer for providing a QoE measurement period, which is used to request UE to transmit a recording session period while transmitting a start indication, so that the assistance MDT uses the same period for measurement;

a request to the application layer for providing a QoE reference, which is used to request UE to transmit a QoE reference while transmitting a start/end indication to indicate which QoE measurement job or jobs start or end;

a request to the application layer for providing a recording session ID, which is used to request the UE to transmit the recording session ID while transmitting a start indication, so as to indicate which recording session or sessions are started;

a request for DRB information, which is used to request the UE to transmit the measured DRB list used by the application layer while transmitting a start indication, so as to indicate which DRBs are to be measured for the assistance MDT measurement;

a request for QoS flow ID, which is used to request the UE to transmit the measured QoS flow ID used by the application layer while transmitting a start indication, so as to indicate which QoS flow ID corresponding to the DRB are to be measured for assistance MDT measurement; and a request for QoS level (such as QCI or 5QI), which is used to request the UE to transmit the measured QCI or 5QI used by the application layer while transmitting a start indication, so as to indicate bearers corresponding to which QCI or 5QI are to be measured for assistance MDT measurement.

In step 602, the second node transmits the QoE measurement configuration to the UE. The QoE measurement configuration is transmitted through a second message, e.g., an RRC reconfiguration message. The message may contain the QoE measurement configuration, which may be contained in the measConfigAppLayer IE. If the measConfigAppLayer is set to "Set", the UE access stratum forwards the measConfigAppLayerContainer to upper layer which considers a service type.

In step 603, if the recording session starts, the UE application layer will transmit a recording session start indication to the UE access stratum, for indicating that the recording session has started, and the UE transmits a third message to the second node, e.g., an RRC message. The message may be a MeasReportAppLayer message, which includes the recording session start indication. The message may further include, but is not limited to, one or more of the following information:

a QoE reference for indicating which QoE measurement job the started recording session belongs to, so that the second node starts an assistance MDT session correlated with the QoE measurement job;

a recording session ID for indicating which recording session in the QoE measurement job is started. The second node can include the recording session ID in the corresponding assistance MDT report to help the QoE data processing node correlate the QoE report with the assistance MDT report;

a recording start time indicating the start time of QoE measurement, so that the second node can use it as the start time of the assistance MDT session to help the assistance MDT measurement keep consistent with QoE measurement in terms of time;
a period, which indicates the period of QoE measurement, or can also be called collection period, so that the second node can use it as the collection period of the assistance MDT session to help the assistance MDT measurement keep consistent with QoE measurement in terms of time;
a DRB list, which may be one or more DRB IDs and is used to indicate which DRB or DRBs are used by the application layer session that measures QoE, so that the second node can perform assistance MDT measurement on the DRB;
a QoS flow ID, which is used to indicate which QoS flow is used by the application layer session that measures QoE, so that the second node can perform assistance MDT measurement on the DRB corresponding to the QoS flow ID; and
a QoS level indication (5QI or QCI), which is used to indicate the QoS level used by the application layer session that measures QoE, so that the second node can perform assistance MDT measurement on the QoS level corresponding to the QoS flow ID.

The above information may be included according to the request in step 602, or may be included by the UE according to its own configuration.

If the assistance MDT configuration has been received from the first node, the trace record session of the assistance MDT should be started at the second node of the given UE when the start indication of the trace record session is received from the UE. In particular, if supported:
if the third message contains "start indication" and a QoE reference, the second node starts the assistance MDT measurement correlated with the QoE reference;
if the third message contains "start indication" and a recording start time, the second node can define the start time of assistance MDT measurement according to the recording start time;
if the third message contains the "start indication" and one or more DRB IDs in the DRB list, the second node may only perform assistance MDT measurement on the DRB;
if the third message contains the "start indication" and the QoS flow ID, the second node may only perform assistance MDT measurement on the DRB(s) corresponding to the QoS flow ID;
if the third message contains a "start indication" and a QoS level (such as QCI or 5QI), the second node may only perform assistance MDT measurement on the QoS level; and
if the third message contains the "start indication" and the recording session ID, the second node saves and updates the recording session ID and includes the recording session ID in the assistance MDT report.

It should be understood that the above-mentioned "start indication" is only an example of indication information that triggers the second node to start assistance MDT measurement. In other embodiments, the indication information may also be "recording session start indication", "activation indication", "QoE degradation indication", or other indications for activating MDT measurement.

In step 604, if the application layer recording session ends, the UE application layer will transmit a recording session end indication prompt to the UE access stratum, for indicating that the recording session ends, and the UE transmits, to the second node, a fourth message to the second node, e.g., a MeasReportAppLayer message, which includes the recording session end indication. The fourth message may further include one or more of the following information:
a QoE reference for indicating which QoE measurement job the recording session end indication belongs to, so that the second node deactivates the assistance MDT session correlated with the QoE measurement job; and
a recording session ID for indicating which recording session in the QoE measurement job has ended, so that the second node deactivates the assistance MDT session correlated with the recording session in the QoE measurement job.

Upon receiving the recording session end indication of the trace recording session of the assistance MDT session from the UE, the second node should stop the trace recording session of the ongoing assistance MDT of the given UE.
If supported:
if the fourth message contains "end indication" and a QoE reference, the second node should stop the assistance MDT measurement correlated with the QoE reference; and
if the fourth message contains "end indication", a QoE reference, and a recording session ID, the second node should stop the assistance MDT measurement correlated with the recording session ID in the QoE reference.

It should be understood that the above-mentioned "end indication" is only an example of indication information that triggers the second node to deactivate the assistance MDT measurement. In other embodiments, the indication information may also be "recording session end indication", "deactivation indication", "QoE improvement indication" or other indications for deactivating MDT measurement.

In step 605, the second node places the application layer correlation information and the assistance MDT report in the trace record and transmits the trace record to a QoE data processing node (QoE data processing center) directly or through an OAM. The application layer correlation information may include a QoE reference, recording start time, and/or a recording session ID.

The QoE data processing node analyzes and optimizes the QoE, e.g., an OAM, a TCE, an MCE, or a node with QoE analysis function in 3GPP network. The QoE data processing node can use the application layer correlation information to find the assistance MDT report correlated with the QoE report, and use the assistance MDT report to analyze the reasons of QoE degradation, so as to identify network problems.

After receiving all QoE reports and assistance MDT reports, the QoE data processing node can correlate the QoE report with the assistance MDT report through a QoE reference and start time in the report. When a QoE measurement job corresponding to one QoE reference has multiple application layer sessions performed simultaneously, the QoE data processing node can correlate the QoE report with the assistance MDT report by the recording session ID in the report. In this way, the QoE data processing node can accurately correlate the QoE report with the assistance MDT report in any case, so as to analyze the QoE problems faster and more accurately.

As described above, a measurement configuration and reporting method for assisting QoE optimization ensures that during QoE measurement collection, by configuring assistance measurement in the network node or UE and the QoE measurements of the application layer start at the same time or basically at the same time, and proceed synchronously or basically synchronously, and through the provided correlation information, operators can correlate QoE measurement and assistance measurement results faster and more accurately, so as to analyze QoE problems accurately and quickly, and then optimize the network and improve user experience. This method can also make the process and object of the assistance measurement more targeted, reduce unnecessary measurement overhead and measurement redundancy, so as to improve the utilization rate of measurement information and save network resources.

Figure 7:
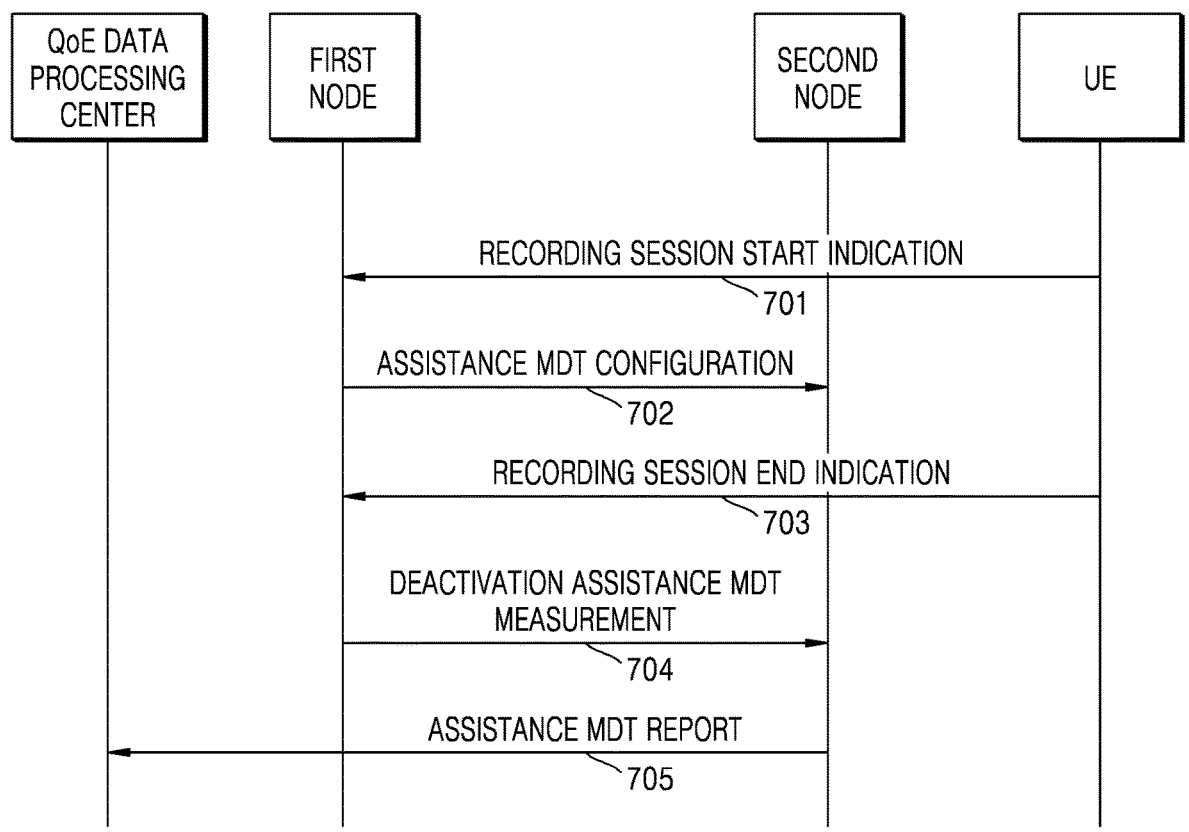
FIG. 7 illustrates a measurement configuration and reporting method for assisting optimization of QoE according to an embodiment.

FIG. 7 illustrates a measurement configuration and reporting method for assisting optimization of QoE according to an embodiment.

Referring to FIG. 7, in step 701, a UE transmits a recording session start indication to a first node, e.g., a CU-CP, a CU, or a base station. The indication is transmitted through an RRC message, which may be a MeasReportAppLayer message, including the recording session start indication.

The RRC message may also include one or more of the following information:
- a QoE reference for indicating which QoE measurement job the started recording session belongs to, so that the second node starts an assistance MDT session correlated with the QoE measurement job;
- a recording session ID for indicating which recording session in the QoE measurement job is started. The second node can include the recording session TD in the corresponding assistance MDT report to help the correlation between the QoE report and the assistance MDT report in the QoE data processing node;
- DRB information, which may be one or more DRB IDs, and is used to indicate which DRB or DRBs are used by the application layer session that measures QoE, so that the second node can perform assistance MDT measurement on the DRB; and
- a QoS flow ID, which is used to indicate which QoS flow is used by the application layer session that measures QoE, so that the second node can perform assistance MDT measurement on the DRB corresponding to the QoS flow ID.

In step 702, the first node transmits the assistance MDT configuration to the second node, which may be a CU-UP, a DU, or a base station.

The possible situations and corresponding messages are:
- if the first node is a CU-CP, the second node may be a CU-UP, and the assistance MDT configuration information may be transmitted through a bearer context setup request message or a trace start message;
- if the first node is a CU, the second node may be a DU, and the assistance MDT configuration information may be transmitted through a UE context setup request message or trace start message; and
- if the first node and the second node are base stations, the first node is the master base station, and the second node is the secondary base station, the assistance MDT configuration information can be transmitted through a secondary node addition request message or trace start message.

The assistance MDT configuration may be similar to the immediate MDT configuration, which can make the second node start MDT measurement immediately. Additionally, the assistance MDT configuration may contain one or more of the following information:
- a QoE reference for indicating which QoE measurement job the assistance MDT measurement is correlated with, so that the second node can start an assistance MDT session correlated with the QoE measurement job. The second node can include the QoE reference in the corresponding assistance MDT report to help the correlation between the QoE report and the assistance MDT report in the QoE data processing node;
- a recording session ID for indicating which recording session in the QoE measurement job the current assistance MDT measurement associates. The second node can include the recording session ID in the corresponding assistance MDT report to help the correlation between the QoE report and the assistance MDT report in the QoE data processing node;
- a DRB list, which may be one or more DRB ID, and is used to indicate the DRB used by the application layer configured with assistance MDT measurement, and the second node only needs to perform assistance MDT measurement on the DRB according to the DRB ID; and
- QoS parameters, which can be QCI or 5QI and are used to indicate the QoS parameters used by the application layer configured with assistance MDT measurement. The second node performs assistance MDT measurement on the QCI or 5QI according to the parameters.

The second node receives the assistance MDT configuration and, if supported:
- if the assistance MDT configuration includes a DRB list, the second node performs assistance MDT measurement on the DRBs in the DRB list;
- if the assistance MDT configuration includes QoS parameters (such as QCI or 5QI), the second node performs assistance MDT measurement on the bearer corresponding to the QoS parameters;
- if the assistance MDT configuration includes a QoE reference, the second node saves the assistance MDT configuration and includes the QoE reference in the generated MDT report, so that the QoE processing node can accurately correlate the QoE report with the assistance MDT report; and
- if the assistance MDT configuration includes the recording session ID, the second node saves the information and includes the recording session ID in the generated assistance MDT report, so that the QoE processing node can accurately correlate the QoE report with the assistance MDT report.

In step 703, if the application layer recording session ends, the UE transmits, to the first node, a recording session end indication, which may be transmitted through an RRC message, e.g., a MeasReportAppLayer message, including the recording session start indication. The RRC message may also include one or more of the following information:
- a QoE reference for indicating which QoE measurement job the end indication of the recording session is aimed at, so that the first node deactivates the assistance MDT session correlated with the QoE measurement job; and
- a recording session ID for indicating which recording session in the QoE measurement job has ended, so that the second node deactivates the assistance MDT session correlated with the recording session in the QoE measurement job.

Upon receiving the recording session end indication of the trace recording session of the assistance MDT session from the UE, the second node should stop the trace recording session of the ongoing assistance MDT of the given UE.

If supported:
- if the message contains an "end indication" and a QoE reference, the second node should stop the assistance MDT measurement correlated with the QoE reference; and if the message contains an "end indication", a QoE reference and a recording session ID, the second node should stop the assistance MDT measurement correlated with the recording session ID in the QoE reference.

In step 704, the first node transmits a deactivation assistance MDT measurement to the second node.

The possible cases and corresponding messages are:
if the first node is a CU-CP, the second node may be a CU-UP, and the deactivation assistance MDT measurement information may be transmitted through a deactivation trace message;
if the first node is a CU, the second node may be a DU, and the deactivation assistance MDT measurement information may be transmitted through a deactivation trace message; and
if the first node and the second node are base stations, the first node is a master base station and the second node is a secondary base station, the deactivation assistance MDT measurement information may be transmitted through a deactivation trace message.

In addition, the deactivation trace message may include one or more of the following information:
a QoE reference for indicating which QoE measurement job the assistance MDT measurement is correlated with, so that the second node deactivates the assistance MDT session correlated with the QoE measurement job; and
a recording session ID for indicating which recording session in the QoE measurement job has ended, so that the second node deactivates the assistance MDT session correlated with the recording session in the QoE measurement job.

The second node receives the deactivation trace message, and if supported:
if the message contains a QoE reference, the second node deactivates the assistance MDT configuration correlated with the QoE reference; and
if the message contains a QoE reference and a recording session ID, the second node deactivates the assistance MDT configuration correlated with the recording session ID in the QoE reference.

In step 705, the second node places the application layer correlation information together with the assistance MDT report in the trace record, where the application layer correlation information may include a QoE reference, recording start time, and/or a recording session ID, and transmits the trace record to a QoE data processing node directly or through the element manager (EM). The QoE data processing node analyzes and optimizes QoE, which can be an OAM, a TCE, an MCE, or a node with QoE analysis function in 3GPP network. The QoE data processing node can use the application layer correlation information to find the assistance MDT report correlated with the QoE report, analyze the reasons of QoE degradation with the assistance MDT report, and then identify network problems.

After receiving all QoE reports and assistance MDT reports, the QoE data processing node can correlate the QoE reports with the assistance MDT reports by the QoE reference and the start time in the report. When a QoE measurement job corresponding to one QoE reference has multiple application layer sessions performed simultaneously, the QoE data processing node can correlate the QoE report with the assistance MDT report by the recording the session ID in the report. Accordingly, the QoE data processing node can accurately correlate the QoE report with the assistance MDT report, so as to analyze the QoE problem faster and more accurately.

As described above, in a measurement configuration and reporting method for assisting QoE optimization, even under the split architecture or multi-connection scenario, by configuring the assistance measurement of the network node or UE and the QoE measurements of the application layer to start at the same time and proceed synchronously, and the operator can correlate the QoE measurement and assistance measurement results faster and more accurately through the provided correlation information, so as to analyze QoE problems, optimize the network and improve the user experience. This method can also make the process and object of the assistance measurement more targeted, reduce unnecessary measurement overhead and measurement redundancy, thereby improving the utilization rate of measurement information and saving network resources.

Figure 8A:
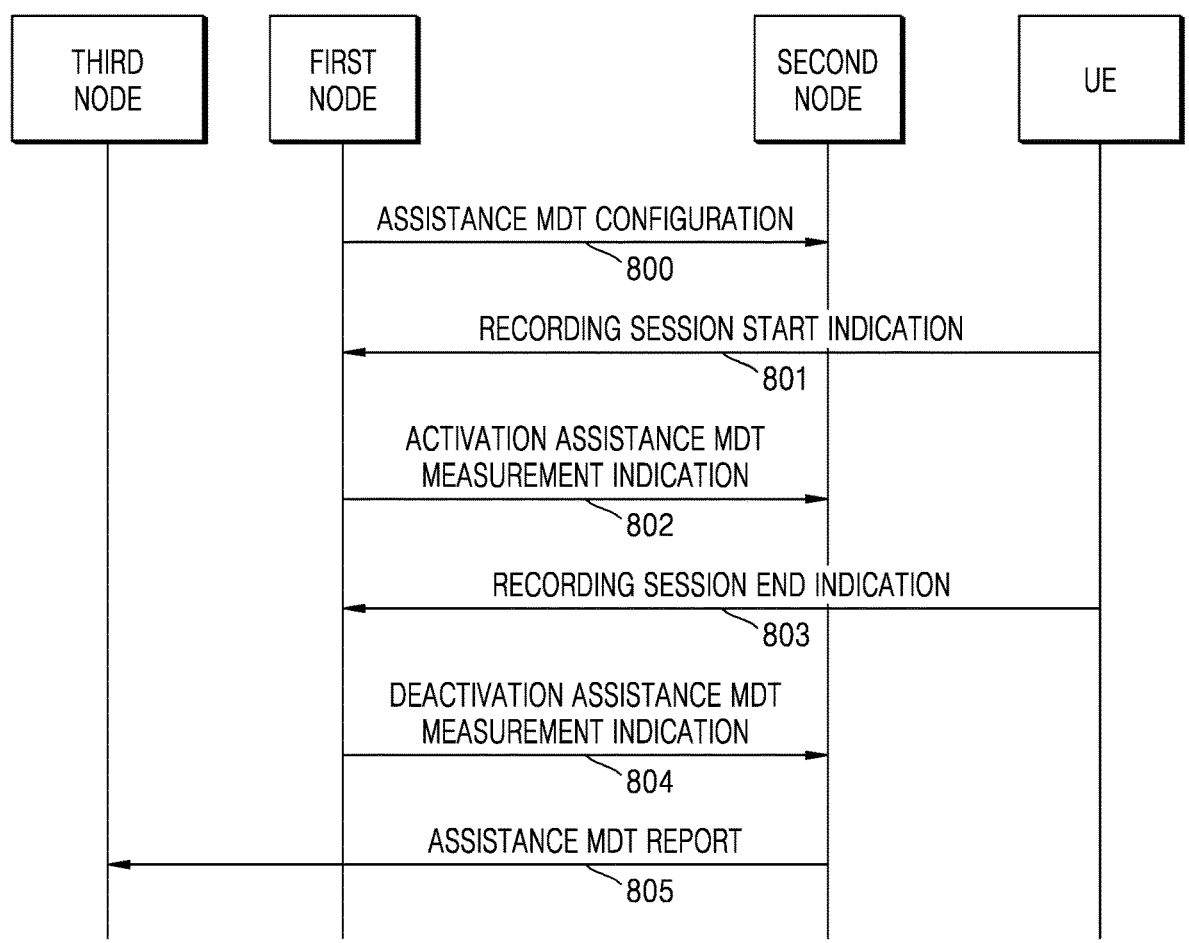
FIG. 8A illustrates a measurement configuration and reporting method for assisting optimization of QoE according to an embodiment.

FIG. 8A illustrates a measurement configuration and reporting method for assisting optimization of QoE according to an embodiment.

Referring to FIG. 8A, in step 800, a first node transmits an assistance MDT configuration to a second node. The first node may be a CU-CP, a CU, or a base station, and the second node may be a CU-UP, a DU, or a base station.

The possible cases and corresponding messages may include:
if the first node is a CU-CP, the second node may be a CU-UP, and the assistance MDT configuration information may be transmitted through a bearer context setup request message or a trace start message;
if the first node is a CU, the second node may be a DU, and the assistance MDT configuration information may be transmitted through a UE context setup request message or trace start message; and
if the first node and the second node are base stations, the first node is the master base station, and the second node is the secondary base station, the assistance MDT configuration information can be transmitted through a secondary node addition request message or trace start message.

If the assistance MDT indication is included in the MDT configuration, the second node will not start the MDT session immediately, and this MDT configuration is called the assistance MDT configuration. The activation mode of this assistance MDT is different from other MDT. For example, two methods are provided below to distinguish the assistance MDT configuration from other MDT configurations (e.g., an immediate MDT, a logged MDT, etc.), so as to indicate the second node not to start the session for the assistance MDT before receiving the corresponding QoE measurement indication.

Method 1: Set an assistance MDT indication in the MDT configuration to indicate that the MDT configuration is an assistance MDT configuration. For example, the assistance MDT indication can be set in the MDT activation IE. The MDT activation IE may be included in the trace activation IE.

If MDT is supported:
if the trace activation IE includes the MDT activation IE, set to "assistance MDT only", the second node should ignore the interface to trace IE and trace depth IE, store the assistance MDT configuration, and use it to start the MDT session when appropriate; and
if the trace activation IE includes the MDT activation IE, set to "assistance MDT and trace", the second node should store the assistance MDT configuration and trace configuration, and use it to start MDT session and trace session when appropriate; The "assistance MDT" can also be "assistance QoE", "assistance UE application layer measurement", or other new descriptions to indicate that this MDT is configured to assist UE application layer measurement.

Method 2: The MDT configuration is included in the UE application layer measurement configuration to implicitly indicate that the MDT configuration is an assistance MDT configuration.

If MDT is supported:
if the UE application layer measurement configuration IE contains an MDT configuration IE, the second node should store the MDT configuration and use it to start the MDT session when appropriate. The MDT configuration is an assistance MDT configuration, which is correlated with the UE application layer measurement, i.e., the assistance MDT configuration is correlated with the QoE reference in the application layer measurement configuration.

In the assistance MDT configuration of Method 1 above, the following information may also be included:
a QoE reference for indicating which QoE measurement job the assistance MDT measurement is correlated with, so that the second node can start an assistance MDT session correlated with the QoE measurement job, and the second node can include the QoE reference in the corresponding assistance MDT report to help the correlation between the QoE report and the assistance MDT report in the QoE data processing node.

In step 801, a UE transmits a recording session start indication to a first node, e.g., through an RRC message. The message may be a MeasReportAppLayer message, including the recording session start indication. The RRC message may also include one or more of a QoE reference, a recording session ID, a DRB list, a QoS flow ID, QoS parameters, etc.

The first node decides to start the assistance MDT measurement based on the received recording session start indication.

In step 802, the first node transmits an activation assistance MDT measurement indication to the second node. The possible cases and corresponding messages include:
if the first node is a CU-CP, the second node may be a CU-UP, and the assistance MDT configuration information may be transmitted through a bearer context setup request message or a trace start message;
if the first node is a CU, the second node may be a DU, and the assistance MDT configuration information may be transmitted through a UE context setup request message or trace start message; and
if the first node and the second node are base stations, the first node is the master base station, and the second node is the secondary base station, the assistance MDT configuration information can be transmitted through a secondary node addition request message or trace start message.

The message containing the activation assistance MDT measurement indication may also contain one or more of the following information:
a QoE reference for indicating which QoE measurement job the assistance MDT measurement is correlated with, so that the second node starts an assistance MDT session correlated with the QoE measurement job. The second node can include the QoE reference in the corresponding assistance MDT report to help the correlation between the QoE report and the assistance MDT report in the QoE data processing node;
a recording session ID for indicating which recording session in the QoE measurement job the current assistance MDT measurement is correlated with. The second node can include the recording session ID in the corresponding assistance MDT report to help the correlation between the QoE report and the assistance MDT report in the QoE data processing node;
a DRB list, which may be one or more DRB IDs and is used to indicate the DRB used by the application layer configured with assistance MDT measurement, and the second node performs assistance MDT measurement on the DRB according to the DRB ID; and
QoS parameters, which can be QCI or 5QI and are used to indicate the QoS parameters used by the application layer configured with assistance MDT measurement. The second node performs assistance MDT measurement on the QCI or 5QI according to the parameters.

The second node receive the message containing the activation assistance MDT measurement indication, and if supported:
if the assistance MDT configuration includes a DRB list, the second node performs the assistance MDT measurement on the DRB in the DRB list;
if the assistance MDT configuration includes QoS parameters (such as QCI or 5QI), the second node performs the assistance MDT measurement on the bearer corresponding to the QoS parameters;
if the assistance MDT configuration includes a QoE reference, the second node saves the information and includes the QoE reference in the generated MDT report, so that the QoE processing node can accurately correlate the QoE report with the assistance MDT report; and
if the assistance MDT configuration includes a recording session ID, the second node saves the information and includes the recording session ID in the generated MDT report, so that the QoE processing node can accurately correlate the QoE report with the assistance MDT report.

In step 803, if the application layer recording session ends, the UE transmits, to the first node, a recording session end indication, which may be transmitted through an RRC message, e.g., a MeasReportAppLayer message, including the recording session start indication.

The RRC message may also include one or more of the following information:
a QoE reference for indicating which QoE measurement job the end indication of the recording session belongs to, so that the first node deactivates the assistance MDT session correlated with the QoE measurement job; and
a recording session ID for indicating which recording session in the QoE measurement job has ended, so that the second node deactivates the assistance MDT session correlated with the recording session in the QoE measurement job.

Upon receiving the recording session end indication of the trace recording session of the assistance MDT session from the UE, the first node should stop the trace recording session of the ongoing assistance MDT of the given UE.

The first node, if supported:
if the message contains an "end indication" and a QoE reference, it is determined that the second node should stop the assistance MDT measurement correlated with the QoE reference.

In step 804, the first node transmits a deactivation assistance MDT measurement indication to the second node.

The possible cases and corresponding messages are:
- if the first node is a CU-CP, the second node may be a CU-UP, and the deactivation assistance MDT measurement information may be transmitted through a deactivation trace message;
- if the first node is a CU, the second node may be a DU, and the deactivation assistance MDT measurement information may be transmitted through a deactivation trace message; and
- if the first node and the second node are base stations, the first node is a master base station and the second node is a secondary base station, the deactivation assistance MDT measurement information may be transmitted through a deactivation trace message.

In addition, the deactivation trace message may include one or more of the following information:
- a QoE reference for indicating which QoE measurement job the assistance MDT measurement is correlated with, so that the second node deactivates the assistance MDT session correlated with the QoE measurement job; and
- a recording session ID for indicating which recording session in the QoE measurement job has ended, so that the second node deactivates the assistance MDT session correlated with the recording session in the QoE measurement job.

The second node receives the deactivation trace message, and if supported:
- if the message contains a QoE reference, the second node deactivates the assistance MDT configuration correlated with the QoE reference, but the assistance MDT configuration is reserved for the establishment of the next session; and
- if the message contains a QoE reference and a recording session ID, the second node deactivates the assistance MDT configuration correlated with the recording session ID in the QoE reference, but the assistance MDT configuration is reserved for the establishment of the next session.

In step 805, the second node places the application layer correlation information together with the assistance MDT report in the trace record, where the application layer correlation information may include a QoE reference, recording start time, and/or a recording session ID, and transmits the trace record to a third node (e.g., a QoE data processing node) directly or through the EM. The QoE data processing node analyzes and optimizes QoE, which can be an OAM, a TCE, an MCE, or a node with QoE analysis function in 3GPP network. The QoE data processing node can use the application layer correlation information to find the assistance MDT report correlated with the QoE report, analyze the reasons of QoE degradation with the assistance MDT report, and then identify network problems.

After receiving all QoE reports and assistance MDT reports, the QoE data processing node can correlate the QoE reports with the assistance MDT reports by the QoE reference and the start time in the report. When a QoE measurement job corresponding to one QoE reference has multiple application layer sessions performed simultaneously, the QoE data processing node can correlate the QoE report with the assistance MDT report by the recording the session ID in the report. Accordingly, the QoE data processing node can accurately correlate the QoE report with the assistance MDT report, so as to analyze the QoE problem faster and more accurately.

As described above, in a measurement configuration and reporting method for assisting QoE optimization in the disclosure, even under the split architecture or multi-connection scenario, the assistance measurement of the network node or UE and the QoE measurements of the application layer are configured to start at the same time and proceed synchronously, and the operator can correlate the QoE measurement and assistance measurement results faster and more accurately by the provided correlation information, so as to analyze QoE problems, optimize the network, and improve the user experience. This method can also make the process and object of the assistance measurement more targeted, and reduce unnecessary measurement overhead and measurement redundancy, thereby improving the utilization rate of measurement information and saving network resources.

Figure 8B:
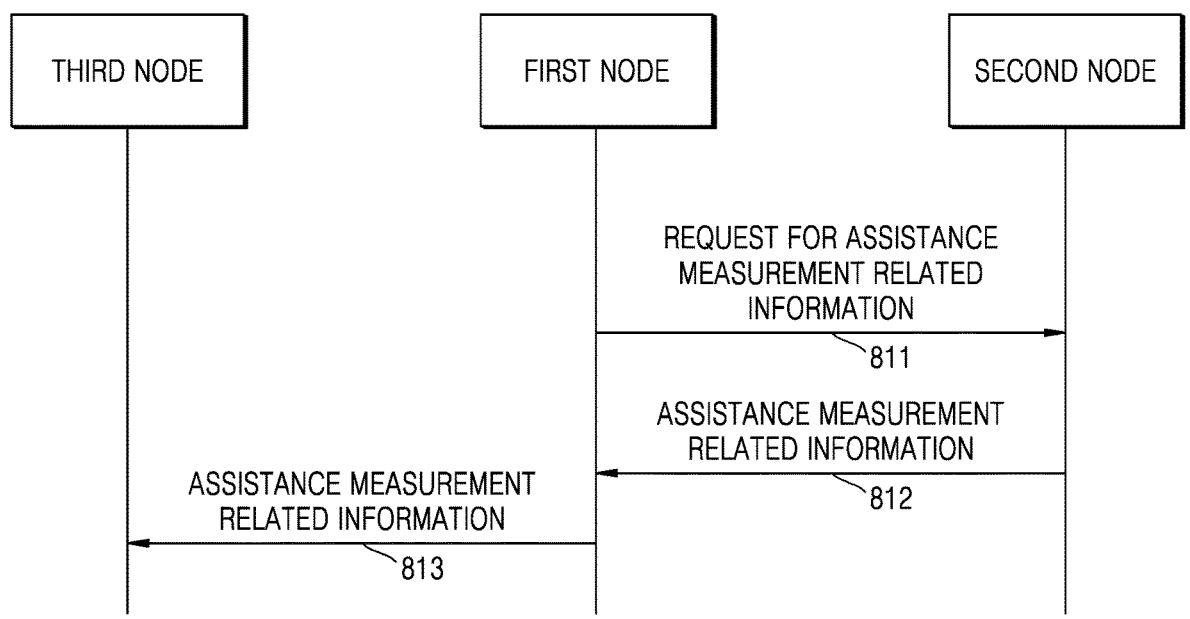
FIG. 8B illustrates a measurement configuration and reporting method for assisting optimization of QoE according to an embodiment.

FIG. 8B illustrates a measurement configuration and reporting method for assisting optimization of QoE according to an embodiment.

Referring to FIG. 8B, in step 811, a first node transmits a message containing related information for requesting assistance measurement to a second node. The first node may be a base station, a gNB, a CU-CP, or a CU, the second node may be a UE or the other node, and the other node may be a core network node or an operation and maintenance node. The assistance measurement is for assisting QoE measurement, and may be an assistance MDT measurement, an immediate MDT measurement, or other radio-related measurement for assisting QoE. If the second node is a UE, the message may be an RRC reconfiguration message or an RRC message for requesting assistance measurement related information, and the first node is the serving node of the current UE. If the second node is a core network node, the message may be a next generation application protocol (NGAP) message for requesting assistance measurement related information, which may include at least one of the following information:
- a QoE reference for indicating the measurement job of the specific QoE corresponding to the request;
- a requesting for assistance measurement information indication, which is used to indicate that the QoE measurement is configured with assistance measurement, so that the second node provides information related to assistance measurement, which may be PDU session related information related to assistance measurement, DRB information, a QoS flow ID, QoS level information, etc.;
- a request for PDU session related information, which is used to request the second node to transmit the PUD session related information used by the application layer service of the QoE measurement, so as to indicate that the node responsible for assistance MDT measurement needs and/or measures the DRB corresponding to the PDU session;
- a request for DRB information, which is used to request the second node to transmit the DRB list used by the application layer service of the QoE measurement, so as to indicate which DRB or DRBs are needed and/or measured by the node responsible for assistance MDT measurement, for assistance MDT measurement;
- a request for a QoS flow ID, which is used to request the second node to transmit the QoS flow ID used by the application layer service of the QoE measurement, so as to indicate that the node responsible for assistance MDT measurement needs to monitor and/or measure the QoS flow ID; and a request for a QoS level (such as QCI or 5QI), which is used to request the second node to transmit the QCI or 5QI used by the application layer service of the QoE measurement, so as to indicate that the node responsible for assistance MDT measurement needs to monitor and/or measure the QCI or 5QI.

The second node may receive the message and information. When the PDU session corresponding to the application layer service requiring QoE measurement has not been established, the second node saves the information, and checks whether there is an application layer service of the QoE measurement using the established or modified PDU session every time the PDU session is established or modified, and if the condition is met, the second node transmits the information related to assistance measurement to the first node, in step 812. When the PDU session corresponding to the application layer service requiring QoE measurement has been established, the second node transmits the information related to assistance measurement to the first node.

If the second node is a UE, the information related to the assistance measurement is transmitted by an RRC message, which may be an RRC reconfiguration complete message or a new RRC message. The message contains information related to the assistance measurement. If the second node is a core network node, the information related to assistance measurement can be transmitted through an NGAP message. The information related to the assistance measurement includes at least one of the following information:

- a QoE reference indicating a QoE measurement job correlated with the assistance measurement;
- PDU session related information, which is used to indicate the PUD session related information used by the application layer service of the QoE measurement, so as to indicate that the node responsible for assistance MDT measurement needs and/or measures the DRB corresponding to the PDU session;
- DRB information, which may be one or more DRB IDs, and is used to indicate the DRB list used by the application layer service of the QoE measurement, so as to indicate which DRB or DRBs are needed and/or measured by the node responsible for assistance MDT measurement, for assistance MDT measurement;
- a QoS flow ID, which is used to indicate the QoS flow ID used by the application layer service of the QoE measurement, so as to indicate that the node responsible for assistance MDT measurement needs to monitor and/or measure the QoS flow ID; and
- a QoS level (such as QCI or 5QI), which is used to indicate the QCI or 5QI used by the application layer service of the QoE measurement, so as to indicate that the node responsible for assistance MDT measurement needs to monitor and/or measure the QCI or 5QI.

The information related to the assistance measurement may be transmitted by the second node according to the request of the first node, or may be initiated by the second node itself.

The first node receives the above information, and if the first node is a base station, the base station monitors or measures the DRB or QoS flow indicated in the information according to the received information related to assistance measurement. The monitoring means that if there is data transmission, a certain amount of data transmission, or continuous data transmission within a certain time in the DRB or QoS flow indicated by the information related to the assistance measurement, the first node can consider that QoE measurement corresponding to the DRB or QoS flow has started, and then the first node starts the assistance MDT related measurement. Similarly, if there is no data transmission or a certain amount of data transmission or continuous data transmission within a period of time in the DRB or QoS flow indicated by the information related to the assistance measurement, the first node can consider that the QoE measurement corresponding to the DRB has ended, and then the first node stops the assistance MDT related measurement. The measurement means that the first node only performs assistance measurement on the indicated DRB or QoS flow. In this way, it can ensure that the assistance measurement at the first node and QoE measurement at UE are synchronized to a certain extent, i.e., the assistance measurement and QoE measurement are consistent in time, and that the measured DRB or QoS flow is related to the QoE measurement, which can better assist QoE analysis and optimize network parameters.

In step 813, if the content of the assistance measurement is related to a third node, the first node transmits the information related to the assistance measurement to the third node, and the information can be obtained by step 812. The third node may be a CU-UP or a DU, and the first node may be a CU-CP or a CU, i.e., the possible cases may include that CU transmits information related to assistance measurement to DU, or CU-CP transmits information related to assistance measurement to CU-UP.

If the third node is a CU-UP and the first node is a CU-CP, the information related to the assistance measurement can be delivered through a bearer context setup request message, a bearer context setup modification message or a trace start message, or it can also be a message for delivering information related to the assistance measurement.

If the third node is a DU and the first node is a CU, the information related to the assistance measurement can be delivered through a UE context setup request message, a UE context modification request message or a trace start message, or a message for delivering the information related to the assistance measurement.

The information related to the assistance measurement is consistent with the content in step 812, and will not be repeated here.

The information related to assistance measurement may be transmitted from the first node to the third node with the configuration of assistance measurement, or may be transmitted from the first node to the third node after the configuration of assistance measurement is transmitted.

The third node receives the information and monitors or measures the DRB or QoS flow indicated in the information according to the received information related to the assistance measurement. The monitoring means that if there is data transmission or a certain amount of data transmission or continuous data transmission within a certain time in the DRB indicated by the information related to the assistance measurement, the third node can consider that the QoE measurement corresponding to the DRB or QoS flow has started, and then the third node starts the assistance MDT related measurement. Similarly, if there is no data transmission or a certain amount of data transmission or continuous data transmission within a period of time in the DRB or QoS flow indicated by the information related to the assistance measurement, the third node can consider that the QoE measurement corresponding to the DRB or QoS flow has ended, and then the third node stops the assistance MDT related measurement. The measurement means that the third node only performs assistance measurement on the indicated DRB or QoS flow. In this way, the assistance measurement at the third node and the QoE measurement at UE are synchronized to a certain extent, i.e., the assistance measurement and the QoE measurement are consistent in time, and the measured DRB or QoS flow is related to the QoE measurement, so that the QoE data processing node that finally collects the QoE report and the assistance measurement report can better correlate the two reports, and use the assistance MDT report to analyze the reasons of QoE degradation, thereby identifying network problems. Accordingly, the QoE data processing node can accurately correlate the QoE report with the assistance MDT report, so as to analyze QoE problems more quickly and accurately.

As described above, in a measurement configuration and reporting method for assisting QoE optimization in the disclosure, when QoE measurement collection is started frequently for many times, the node responsible for assistance measurement can monitor and infer whether the QoE measurement starts or not through information related to assistance measurement configuration, and the monitor result starts or end the assistance measurement, so that even if the UE is not needed to notify the node responsible for assistance measurement through signaling every time, the assistance measurement of the network node and the QoE measurements of the application layer can be started at the same time or basically at the same time, and proceeded synchronously or basically synchronously. Even if the UE application layer service turns on or off frequently, without additional network indication, the node responsible for the assistance measurement can monitor whether the application layer measurement starts or not through the received information related to assistance measurement, so that the operator can correlate the QoE measurement and assistance measurement results faster and more accurately with the least network signaling overhead, so as to accurately and quickly analyze QoE problems, thereby optimizing the network and improving the user experience. This method can also make the process and object of the assistance measurement more targeted, reduce unnecessary measurement overhead and measurement redundancy, so as to improve the utilization rate of measurement information and save network resources.

NG Handover

Figure 9:
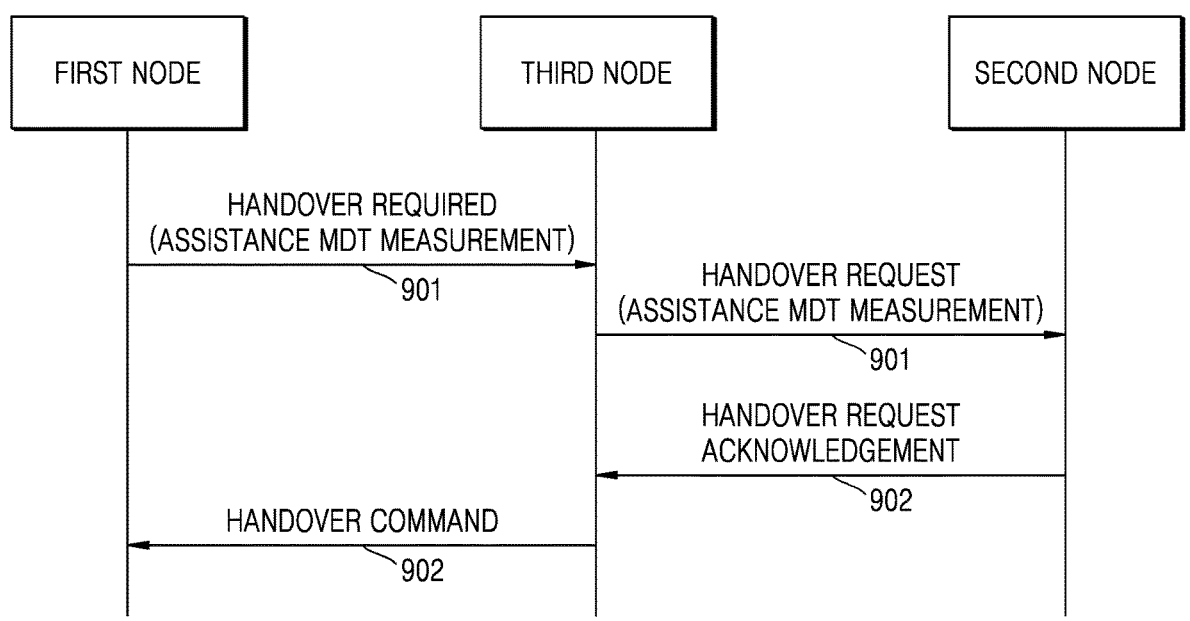
FIG. 9 illustrates a measurement configuration and reporting method for assisting optimization of QoE according to an embodiment.

FIG. 9 illustrates a measurement configuration and reporting method for assisting optimization of QoE according to an embodiment.

Referring to FIG. 9, in step 901, the first node starts a handover process by transmitting a handover required message to the third node, which then transmits the request to the second node. For example, the first node is a base station, e.g., an eNB or a gNB, and the third node is a core network, e.g., an AMF.

The handover required message may include application layer measurement configuration and/or assistance MDT configuration, and the specific content of the assistance MDT configuration is consistent with description of step 601 in FIG. 6.

The second node may be a base station, e.g., an eNB or a gNB.

The handover request message may contain application layer measurement configuration and/or assistance MDT configuration, and the specific content of the assistance MDT configuration is consistent with the assistance MDT configuration in the handover required message.

If the second node supports the assistance MDT measurement, there are two cases for processing the assistance MDT configuration.

Case 1: The MDT Configuration Contains the Assistance MDT Indication:
If the trace activation IE includes an MDT activation IE, set to "assistance MDT only" or "assistance MDT", the second node should ignore interface to trace IE and trace depth IE, and store the assistance MDT configuration and use it to start an MDT session when appropriate; and
If the trace activation IE includes an MDT activation IE, set to "assistance MDT and trace", the second node should store the assistance MDT configuration and trace configuration, and use it to start an MDT session and trace session when appropriate.

Case 2: The UE Application Layer Configuration Contains the Assistance MDT Configuration:
if the UE application layer measurement configuration contains an MDT measurement configuration, the second node should store the assistance MDT configuration and use it to start an MDT session when necessary.

The above two cases correspond to the two methods in step 601 of FIG. 6. That is, case 1 corresponds to method 1 in step 601, and case 2 corresponds to method 2 in step 601.

The handover required and handover request message may also contain an assistance MDT state, which may be called an application layer measurement state or a recording state, and is used to indicate to the second node whether the first node has started the assistance MDT measurement. The state information may be included in the assistance MDT configuration or the application layer measurement configuration. If it has been started, the second node starts the requested assistance MDT session; if not, the second node saves the assistance MDT configuration and starts the assistance MDT session when appropriate. The assistance MDT state can also be expressed by recording session indication information or in other forms.

In addition, the assistance MDT configuration can also include one or more of the following information:
  a QoE reference for indicating which QoE measurement job the assistance MDT measurement is correlated with, so that the second node starts the assistance MDT session correlated with the QoE measurement job. The second node may include the QoE reference into the corresponding assistance MDT report to help the first node (e.g., a QoE data processing node) correlate the QoE report with the assistance MDT report;
  a recording session ID for indicating which recording session in the QoE measurement job the current assistance MDT measurement is correlated with. The second node can include the recording session ID in the corresponding assistance MDT report to help the QoE data processing node correlate the QoE report with the assistance MDT report;
  a period, which indicates the period of QoE measurement or collection period, so that the second node can use it as the collection and measurement period of the assistance MDT session to help the assistance MDT measurement keep consistent with QoE measurement in terms of time;
  a period time indication: if the assistance MDT measurement and QoE measurement use a same measurement period, the first node should inform which time in the measurement period the assistance MDT measurement at the first node is going to, through an assistance MDT time indication. The time indication can be the relative time of the start or end of the latest period or the absolute time of the start or end of the latest period. The second node can calculate or directly obtain the generation time of the first assistance MDT report at the second node according to the assistance MDT time indication. If the time is obtained by calculation, the period information should be measured;

a QoS flow ID, which is used to indicate the QoS flow used by the application layer configured with the assistance MDT measurement. The second node performs the assistance MDT measurement on one or more DRBs corresponding to the QoS flow; and a QoS level (5QI or QCI), which is used to indicate the QoS level used by the application layer configured with the assistance MDT measurement. The second node performs the assistance MDT measurement on the QoS level, according to the QoS level.

The second node receives the handover request message and, if supported:

if the message contains the assistance MDT configuration and the assistance MDT state is "started", the second node starts the assistance MDT measurement;

if the assistance MDT configuration contains the QoS flow ID and the assistance MDT state is "started", the second node performs the assistance MDT measurement on the DRB corresponding to the QoS flow ID;

if the assistance MDT configuration includes the QoS level (such as QCI or 5QI) and the assistance MDT state is "started", the second node performs assistance MDT measurement on the QoS level;

if the assistance MDT configuration includes the period time indication for indicating the time from the last generation of the assistance QoE report, which is time within one period, the second node should consider the time indication when generating the next assistance MDT report in order to keep alignment with the QoE report in terms of time. If the next assistance MDT report is not generated at the second node, the second node will add the time for the UE staying at the second node to the period time indication;

if a QoE reference is included in the assistance MDT configuration, the second node saves the information and includes the QoE reference in the generated MDT report, so that the QoE processing node can accurately correlate the QoE report with the assistance MDT report; and if the assistance MDT configuration includes the recording session ID, the second node saves the information and includes the recording session ID in the generated MDT report, so that the QoE processing node can accurately correlate the QoE report with the assistance MDT report.

In step 902, the second node transmits a handover request acknowledgement message to the third node, which transmits a handover command to the first node.

According to that received assistance MDT configuration and state information, the second node determines the assistance MDT measurements correlated with which QoE reference(s) are to be started, and the assistance MDT measurements correlated with which QoE reference(s) are temporarily not started. For a measurement that is to start the assistance MDT, the second node may decide to measure only the DRB(s) corresponding to the QoS flow ID according to the QoS flow ID, and the second node may also decide the next generation time of the assistance MDT report according to the period time indication and the collection period information. The generation of the MDT report corresponds to its correlated QoE report one by one. If the assistance MDT report is generated at the second node, the second node can place the application layer related information and the assistance MDT report in the trace record together, and the application layer related information can include a QoE reference, a recording start time, and a recording session ID. The trace record may be transmitted to the QoE data processing node directly or through the EM. The QoE data processing node analyzes and optimizes QoE, and can be an OAM, a TCE, an MCE, or a node with QoE analysis function in 3GPP network. The QoE data processing node can use the application layer related information to find the assistance MDT report correlated with the QoE report, and use the assistance MDT report to analyze the reasons of QoE degradation, and then identify network problems.

After receiving all QoE reports and assistance MDT reports, the QoE data processing node can correlate the QoE report with the assistance MDT report through the QoE reference and start time in the report. When a QoE measurement job corresponding to one QoE reference has multiple application layer sessions performed simultaneously, the QoE data processing node can correlate the QoE report with the assistance MDT report by the recording session ID in the report. In this way, the QoE data processing node can accurately correlate the QoE report with the assistance MDT report in any case, so as to analyze the QoE problems faster and more accurately.

As described above, in a measurement configuration and reporting method for assisting QoE optimization in the disclosure, even in the scene of UE handover, the assistance measurement of the network node or UE and the QoE measurements of application layer are configured to start at the same time, and proceed synchronously. Through the provided correlation information, operators can correlate QoE measurement and assistance measurement results faster and more accurately, so as to analyze QoE problems, and then optimize the network and improve user experience. This method can also make the process and object of the assistance measurement more targeted, and reduce unnecessary measurement overhead and measurement redundancy, so as to improve the utilization rate of measurement information and save network resources.

RRC Reestablishment or Resume

Figure 10:
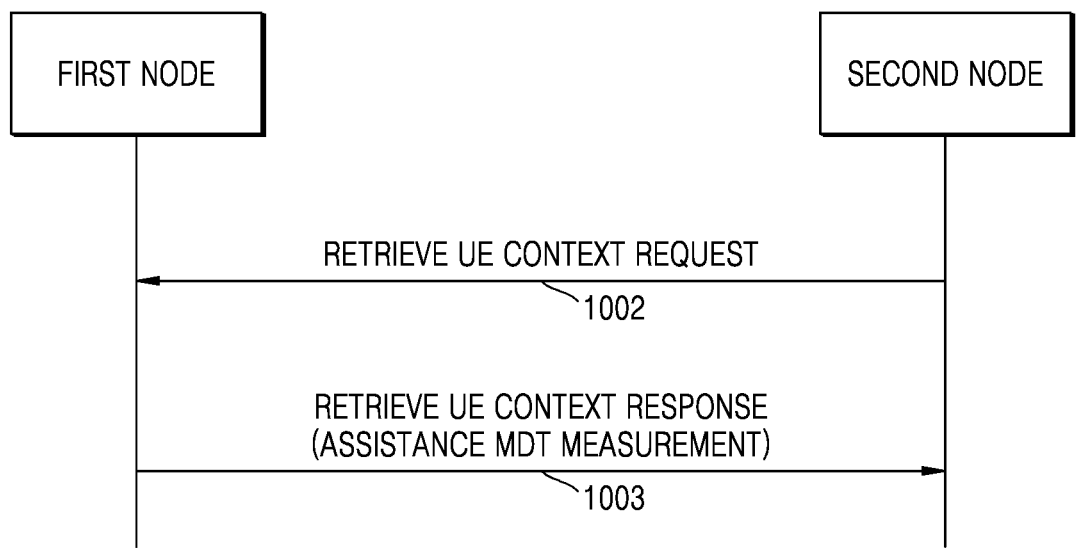
FIG. 10 illustrates a measurement configuration and reporting method for assisting optimization of QoE according to an embodiment.

FIG. 10 illustrates a measurement configuration and reporting method for assisting optimization of QoE according to an embodiment.

Referring to FIG. 10, in step 1002, the second node transmits a retrieve UE context request message to the first node. The first node and the second node are base stations, e.g., an eNB or a gNB.

In step 1003, the first node transmits a retrieve UE context response message to the second node. The message may include application layer measurement configuration and/or assistance MDT configuration, and the specific contents of the assistance MDT configuration are consistent with those as described with reference to step 601 in FIG. 6. If the second node supports assistance MDT measurement, there are two cases for processing assistance MDT configuration.

Case 1: The MDT Configuration Contains the Assistance MDT Indication:

if the trace activation IE includes an MDT activation IE, set to "assistance MDT only" or "assistance MDT", the second node should ignore interface to trace IE and trace depth IE, and store the assistance MDT configuration and use it to start an MDT session when appropriate; and if the trace activation IE includes an MDT activation IE, set to "assistance MDT and trace", the second node should store the assistance MDT configuration and trace configuration, and use it to start an MDT session and trace session when appropriate.

Case 2: The UE Application Layer Configuration Contains the Assistance MDT Configuration:

if the UE application layer measurement configuration contains the MDT measurement configuration, the second node should store the assistance MDT configuration and use it to start an MDT session when appropriate.

The above two cases correspond to the two methods in step 601 of FIG. 6. That is, case 1 corresponds to method 1 in step 601, and case 2 corresponds to method 2 in step 601.

The message may also contain an assistance MDT state, which is used to indicate to the second node whether the first node has started the assistance MDT measurement. The state information may be included in the assistance MDT configuration or the application layer measurement configuration. If it has been started, the second node starts the requested assistance MDT session; if not, the second node saves the assistance MDT configuration and starts the assistance MDT session when necessary. The assistance MDT state can also be expressed by recording session indication information or in other forms.

In addition, the assistance MDT configuration can also include one or more of the following information:

a QoE reference for indicating which QoE measurement job the assistance MDT measurement is correlated with, so that the second node starts the assistance MDT session correlated with the QoE measurement job. The second node may include the QoE reference into the corresponding assistance MDT report to help the QoE data processing node correlate the QoE report with the assistance MDT report;

a recording session ID for indicating which recording session in the QoE measurement job the current assistance MDT measurement is correlated with. The second node can include the recording session ID in the corresponding assistance MDT report to help the QoE data processing node correlate the QoE report with the assistance MDT report;

a period, which indicates the period of QoE measurement or a collection period, so that the second node can use it as the collection and measurement period of the assistance MDT session, to help the assistance MDT measurement keep consistent with QoE measurement in terms of time;

a period time indication: if the assistance MDT measurement and QoE measurement use the same measurement period, the first node should inform which time in the measurement period the assistance MDT measurement at the first node is going to, through an assistance MDT time indication. The time indication can be the relative time of the start or end of the latest period or the absolute time of the start or end of the latest period. The second node can calculate or directly obtain the generation time of the first assistance MDT report at the second node according to the assistance MDT time indication. If the time is obtained by calculation, the period information should be measured;

QoS flow ID, which is used to indicate the QoS flow used by the application layer configured with the assistance MDT measurement. The second node performs the assistance MDT measurement on one or more DRBs according to the QoS flow ID; and a QoS level (5QI or QCI), which is used to indicate the QoS level used by the application layer configured with the assistance MDT measurement. The second node performs the assistance MDT measurement on the QoS level, according to the QoS level.

The second node receives the handover request message and, if supported:

if the message contains the assistance MDT configuration and the assistance MDT state is "started", the second node starts the assistance MDT measurement;

if the assistance MDT configuration contains the QoS flow ID and the assistance MDT state is "started", the second node performs the assistance MDT measurement on the DRB corresponding to the QoS flow ID;

if the assistance MDT configuration includes the QoS level (such as QCI or 5QI) and the assistance MDT state is "started", the second node performs assistance MDT measurement on the QoS level;

if the assistance MDT configuration includes the period time indication for indicating the time from the last generation of the assistance QoE report, which is time within one period. The second node should consider the time indication when generating the next assistance MDT report in order to keep alignment with the QoE report in terms of time. If the next assistance MDT report is not generated at the second node, the second node will add the time for the UE staying at the second node to the period time indication;

If the assistance MDT configuration includes a QoE reference, the second node saves the information and includes the QoE reference in the generated MDT report, so that the QoE processing node can accurately correlate the QoE report with the assistance MDT report; and If the assistance MDT configuration includes the recording session ID, the second node saves the information and includes the recording session ID in the generated MDT report, so that the QoE processing node can accurately correlate the QoE report with the assistance MDT report.

According to that received assistance MDT configuration and state information, the second node determines the assistance MDT measurements correlated with which QoE reference(s) are be started, and the assistance MDT measurements correlated with which QoE reference(s) are temporarily not started. For the measurement that is to start the assistance MDT, the second node may decide to measure only the DRB(s) corresponding to the QoS flow ID according to the QoS flow ID, and the second node may also decide the next generation time of the assistance MDT report according to the period time indication and the collection period information. The generation of the MDT report corresponds to its correlated QoE report one by one. If the assistance MDT report is generated at the second node, the second node can place the application layer related information and the assistance MDT report together in the trace record, and the application layer related information can include an QoE reference, a recording start time, and a recording session TD. The trace record will be transmitted to the QoE data processing node directly or through the EM. The QoE data processing node analyzes and optimizes QoE, and can be an OAM, a TCE, an MCE, or a node with QoE analysis function in 3GPP network. The QoE data processing node can use the application layer related information to find the assistance MDT report correlated with the QoE report, and use the assistance MDT report to analyze the reasons of QoE degradation, and then identify network problems.

After receiving all QoE reports and assistance MDT reports, the QoE data processing node can correlate the QoE report with the assistance MDT report through the QoE reference and start time in the report. When a QoE measurement job corresponding to one QoE reference has multiple application layer sessions performed simultaneously, the QoE data processing node can correlate the QoE report with the assistance MDT report by the recording session ID in the report. In this way, the QoE data processing node can accurately correlate the QoE report with the assistance MDT report in any case, so as to analyze the QoE problems faster and more accurately.

As described above, in a measurement configuration and reporting method for assisting QoE optimization in the disclosure, even after the UE RRC connection is re-established or resumed, the assistance measurement of the network node or UE and QoE measurements of the application layer are configured to start at the same time, and proceed synchronously. Through the provided correlation information, operators can correlate QoE measurement and assistance measurement results faster and more accurately, so as to analyze QoE problems, and then optimize the network and improve user experience. This method can also make the process and object of the assistance measurement more targeted, and reduce unnecessary measurement overhead and measurement redundancy, so as to improve the utilization rate of measurement information and save network resources.

Figure 11:
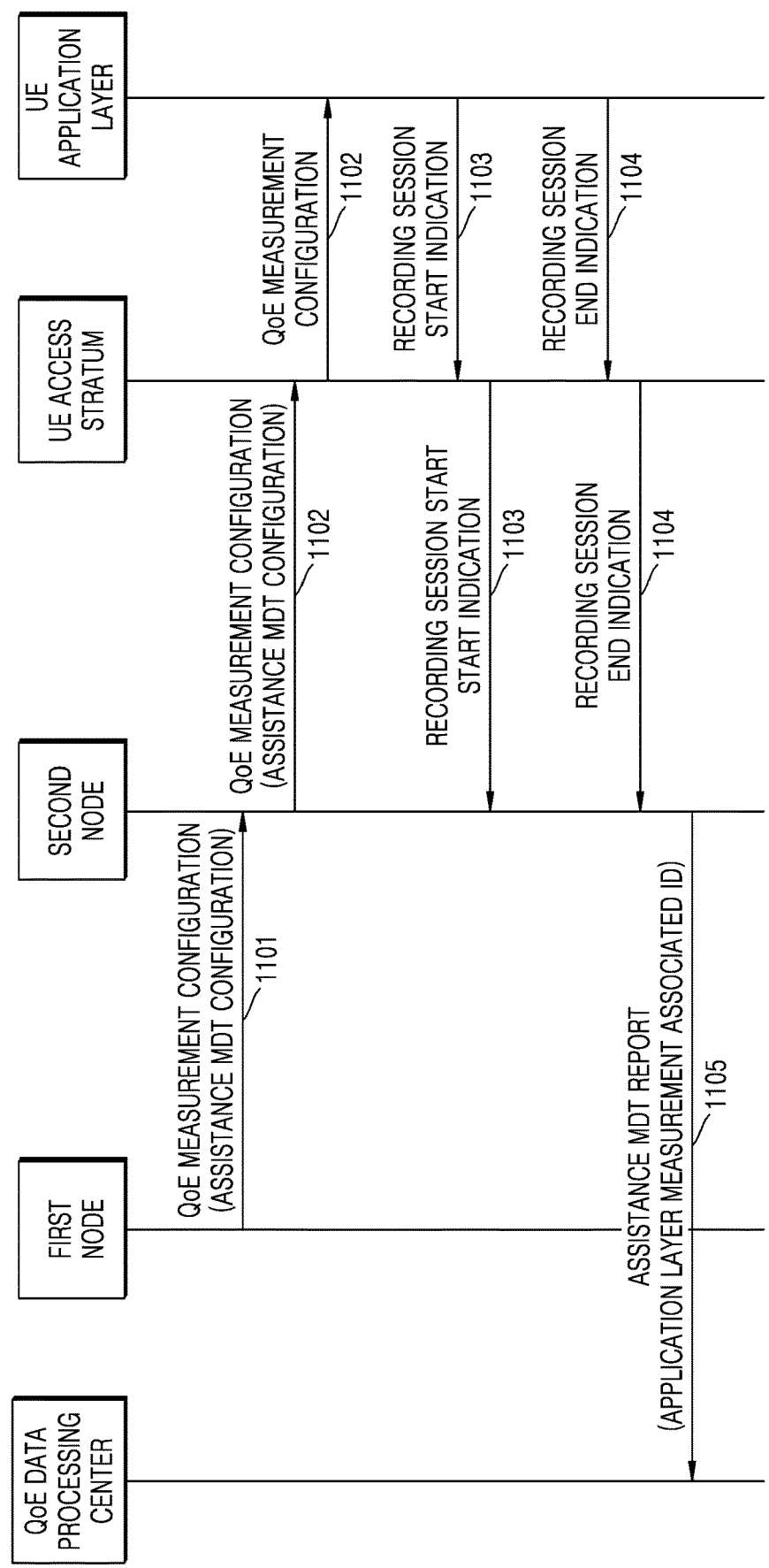
FIG. 11 illustrates a measurement configuration and reporting method for assisting optimization of QoE according to an embodiment.

FIG. 11 illustrates a measurement configuration and reporting method for assisting optimization of QoE according to an embodiment.

Referring to FIG. 11, in step 1101, the first node starts the activation of QoE measurement and transmits the QoE measurement configuration to the second node. The first node may be a core network node or an OAM, and the second node may be a gNB or an eNB. The QoE measurement configuration is defined by a UE application layer measurement configuration IE. The UE application layer measurement represents a measurement in a UE application layer, and the QoE measurement is a kind of measurement in the UE application layer. The UE application layer measurement configuration IE may be included in the trace activation IE, and the trace activation IE may be included in the first message. If the first node is a core network node, the first message may be an initial context setup request message or a trace start message. If the first node is an OAM, the first message may be an activation task from OAM.

If there is a radio-related measurement to assist QoE management analysis, the radio-related measurement configuration will be transmitted with the QoE measurement configuration. The radio-related measurement may be an MDT measurement, an MDT-like measurement, or/and an on-node counter measurement. Since the radio-related measurement can be used to assist QoE analysis to identify QoE degradation problems, the radio-related measurement should be aligned with the corresponding QoE measurement in terms of time. An MDT mechanism can be used to trigger radio-related measurement. If an MDT measurement is used to assist a QoE optimization analysis, the MDT measurement can be called assistance MDT. If an assistance MDT indication is included in the MDT configuration, the second node will not start the MDT session immediately. The activation mode of this MDT configuration is different from other MDT. For example, two methods are described below, which can be used to distinguish the assistance MDT configuration from other MDT configurations (e.g., an immediate MDT, a logged MDT, etc.), so as to indicate the second node not to start the session for the assistance MDT before receiving the corresponding QoE measurement indication.

Method 1: set an assistance MDT indication in the MDT configuration to indicate that the MDT configuration is assistance MDT configuration. For example, the assistance MDT indication can be set in the MDT activation IE. The MDT activation IE may be included in the trace activation IE.

If MDT is supported:
 if the trace activation IE includes an MDT activation IE, set to "assistance MDT only" or "assistance MDT", the second node should ignore interface to trace IE and trace depth IE, and store the assistance MDT configuration and use it to start or activate an MDT session when appropriate; and
 if the trace activation IE includes an MDT activation IE, set to "assistance MDT and trace", the second node should store the assistance MDT configuration and trace configuration, and use it to start an MDT session and trace session when appropriate.

The "assistance MDT" can also be "assistance QoE", "assistance UE application layer measurement" or other new descriptions to indicate that this MDT is configured to assist UE application layer measurement.

Method 2: the MDT configuration is included in the UE application layer measurement configuration to implicitly indicate that the MDT configuration is an assistance MDT configuration.

If it is supported:
 if a UE application layer measurement configuration IE contains an MDT configuration IE, the second node should store the MDT configuration and use it to start an MDT session when appropriate. The MDT configuration is assistance MDT configuration, correlated with the UE application layer measurement. That is, the assistance MDT configuration is correlated with the QoE reference in the application layer measurement configuration.

In the assistance MDT configuration of the above method 1, the following information may also be included:
 a QoE reference for indicating which QoE measurement job the assistance MDT measurement is correlated with, so that the second node starts the assistance MDT session correlated with the QoE measurement job. The second node may include the QoE reference into the corresponding assistance MDT report to help the QoE data processing node correlate the QoE report with the assistance MDT report.

In step 1102, the second node transmits the QoE measurement configuration and the assistance MDT configuration to the UE. The QoE measurement configuration is transmitted through a second message, which may be an RRC reconfiguration message. The message may contain the QoE measurement configuration, which may be contained in the measConfigAppLayer IE. If the measConfigAppLayer is set to "Set", the UE access stratum forwards the measConfigAppLayerContainer to the upper layer considering the service type.

If there is assistance MDT configuration correlated with the QoE measurement configuration in the second node, the QoE measurement configuration may include the following information:
 an indication or a request for informing or requesting the application layer to transmit a start/end indication of each recording session;
 a request to the application layer for providing QoE measurement period, which is used to request UE to transmit a recording session period while transmitting a start indication, so as to assist MDT to use the same period for measurement;
a request to the application layer for providing a QoE reference, which is used to request UE to transmit a QoE reference while transmitting a start/end indication to indicate which QoE measurement job starts or ends;
a request to the application layer for providing a recording session ID, which is used to request the UE to transmit the recording session ID while transmitting a start indication, so as to indicate which recording session is started;
a request for DRB information, which is used to request the UE to transmit the measured DRB list used by the application layer while transmitting a start indication, so as to indicate which DRBs are to be measured for the assistance MDT measurement;
a request for a QoS flow ID, which is used to request the UE to transmit the measured QoS flow ID used by the application layer while transmitting a start indication, so as to indicate that DRBs corresponding to which QoS flow ID are be measured for assistance MDT measurement; and
a request for a QoS level (such as QCI or 5QI), which is used to request the UE to transmit the measured QCI or 5QI used by the application layer while transmitting a start indication, so as to indicate only bearers corresponding to which QCI or 5QI are to be measured for assistance MDT measurement.

If the UE receives the assistance MDT configuration, the UE saves the assistance MDT configuration and starts the assistance MDT session when appropriate. The UE determines whether it is the assistance MDT configuration by the method described above with reference to step 601 in FIG. 6.

In step 1103, if the recording session starts, the UE application layer will transmit a recording session start indication to the UE access stratum, for indicating that the recording session has started, and the UE access stratum will start the assistance MDT measurement according to the indication and transmit a third message to the second node. The third message may be an RRC message, e.g., a MeasReportAppLayer message, which includes the recording session start indication. The message may include one or more of the following information:
a QoE reference for indicating which QoE measurement job the started recording session belongs to, so that the second node starts an assistance MDT session correlated with the QoE measurement job;
a recording session ID for indicating which recording session in the QoE measurement job is started. The second node can include the recording session ID in the corresponding assistance MDT report to help the QoE data processing node correlate the QoE report with the assistance MDT report;
a recording start time indicating the start time of QoE measurement, so that the second node can use it as the start time of the assistance MDT session, to help the assistance MDT measurement keep consistent with QoE measurement in terms of time;
a period, which indicates the period of QoE measurement or a collection period, so that the second node can use it as the collection period of the assistance MDT session, to help the assistance MDT measurement keep consistent with QoE measurement in terms of time;
DRB information, which may be one or more DRB IDs. and is used to indicate which DRB or DRBs are used by the application layer session that measures QoE, so that the second node can perform assistance MDT measurement on the DRB;
a QoS flow ID, which is used to indicate which QoS flow is used by the application layer session that measures QoE, so that the second node can perform assistance MDT measurement on the DRB corresponding to the QoS flow ID; and
a QoS level indication (5QI or QCI), which is used to indicate the QoS level used by the application layer session that measures QoE, so that the second node can perform assistance MDT measurement on the QoS level corresponding to the QoS flow ID.

The above information may be included according to the request in step 1102, or may be included by the UE according to its own configuration.

If the assistance MDT configuration has been received from the first node, the trace record session of the assistance MDT should be started at the second node of the given UE when the start indication of the trace record session is received from the UE. In particular, if supported:
if the third message contains an "start indication" and a QoE reference, the second node starts the assistance MDT measurement correlated with the QoE reference;
if the third message contains an "start indication" and recording start time, the second node can define the start time of assistance MDT measurement according to the recording start time;
if the third message contains the "start indication" and one or more DRB IDs in the DRB list, the second node may only perform assistance MDT measurement on the DRB(s);
if the third message contains the "start indication" and the QoS flow ID, the second node may only perform assistance MDT measurement on the DRB(s) corresponding to the QoS flow ID;
if the third message contains a "start indication" and a QoS level (such as QCI or 5QI), the second node may only perform assistance MDT measurement on the QoS level; and
if the third message contains the "start indication" and the recording session ID, the second node saves and updates the recording session ID and includes the recording session ID in the assistance MDT report.

In step 1104, if the application layer recording session ends, the UE application layer transmits a recording session end indication prompt to the UE access stratum, for indicating that the recording session ends, and the UE access stratum ends the assistance MDT measurement according to the indication and transmits, to the second node, a fourth message, e.g., a MeasReportAppLayer message, including the recording session end indication. The fourth message may also include the following information:
a QoE reference for indicating which QoE measurement job the recording session end indication belongs to, so that the second node deactivates the assistance MDT session correlated with the QoE measurement job; and
a recording session ID for indicating which recording session in the QoE measurement job has ended, so that the second node deactivates the assistance MDT session correlated with the recording session in the QoE measurement job.

Upon receiving the recording session end indication of the trace recording session of the assistance MDT session from the UE, the second node should stop the trace recording session of the ongoing assistance MDT of the given UE.

If supported:
if the fourth message contains an "end indication" and a QoE reference, the second node should stop the assistance MDT measurement correlated with the QoE reference; and
if the fourth message contains an "end indication", a QoE reference and a recording session ID, the second node should stop the assistance MDT measurement correlated with the recording session ID in the QoE reference.

In step 1105, the second node places the application layer correlation information and the assistance MDT report together in the trace record and transmits the trace record to a QoE data processing node (e.g., a QoE data processing center) directly or through an OAM. The application layer correlation information may include a QoE reference, a recording start time, and a recording session ID. The QoE data processing node analyzes and optimizes QoE, and can be an OAM, a TCE, an MCE, or a node with QoE analysis function in 3GPP network. The QoE data processing node can use the application layer correlation information to find the assistance MDT report correlated with the QoE report, and use the assistance MDT report to analyze the reasons of QoE degradation, so as to identify network problems.

After receiving all QoE reports and assistance MDT reports, the QoE data processing node can correlate the QoE report with the assistance MDT report through a QoE reference and start time in the report. When a QoE measurement job corresponding to one QoE reference has multiple application layer sessions performed simultaneously, the QoE data processing node can correlate the QoE report with the assistance MDT report by the recording session ID in the report. In this way, the QoE data processing node can accurately correlate the QoE report with the assistance MDT report in any case, so as to analyze the QoE problems faster and more accurately.

As described above, in a measurement configuration and reporting method for assisting QoE optimization in the disclosure, during QoE measurement collection, the assistance measurement of the network node or UE and the QoE measurements of the application layer are configured to start at the same time, and proceed synchronously. Through the provided correlation information, operators can correlate QoE measurement and assistance measurement results faster and more accurately, so as to analyze QoE problems accurately and quickly, and then optimize the network and improve user experience. This method can also make the process and object of the assistance measurement more targeted, and reduce unnecessary measurement overhead and measurement redundancy, so as to improve the utilization rate of measurement information and save network resources.

Xn Handover

Figure 12:
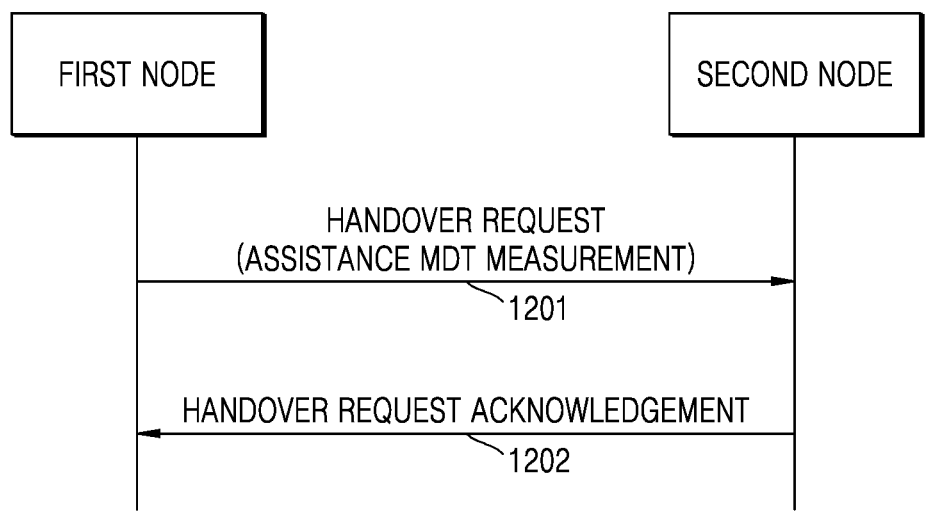
FIG. 12 illustrates a measurement configuration and reporting method for assisting optimization of QoE according to an embodiment.

FIG. 12 illustrates a measurement configuration and reporting method for assisting optimization of QoE according to an embodiment.

Referring to FIG. 12, in step 1201, the first node starts the handover process by transmitting a handover request message to the second node. For example, the first node and the second node may be base stations, e.g., an eNB or a gNB. In a handover scenario, the first node is a source base station and the second node is a target base station.

The handover request message may include a UE application layer measurement configuration and/or an assistance MDT configuration, and the specific contents of the UE application layer measurement configuration and assistance MDT configuration are consistent with those as described with reference to step 601 of FIG. 6. If the second node supports assistance MDT measurement, there are two cases for processing assistance MDT configuration.

Case 1:
if the trace activation IE includes an MDT activation IE, set to "assistance MDT only" or "assistance MDT", the second node should ignore interface to trace IE and trace depth IE, and store the assistance MDT configuration and use it to start an MDT session when appropriate; and
if the trace activation IE includes an MDT activation IE, set to "assistance MDT and trace", the second node should store the assistance MDT configuration and trace configuration, and use it to start the MDT session and trace session when appropriate.

Case 2:
if the UE application layer measurement configuration contains an MDT measurement configuration, the second node should store the assistance MDT configuration and use it to start an MDT session when appropriate.

The above two cases correspond to the two methods in step 601 of FIG. 6. That is, case 1 corresponds to method 1 in step 601, and case 2 corresponds to method 2 in step 601.

The handover request message may also contain an assistance MDT state, which may be called an application layer measurement state or recording state, and is used to indicate, to the second node, whether the first node has started the assistance MDT measurement. The state information may be included in the assistance MDT configuration or the application layer measurement configuration. If the state is started, the second node starts the assistance MDT session related to the handover request, and if the state is not started, the second node saves the assistance MDT configuration and starts the assistance MDT session when appropriate. The assistance MDT state can also be expressed by recording session indication information or in other forms.

In addition, the assistance MDT configuration can also include one or more of the following information:
a QoE reference for indicating which QoE measurement job the assistance MDT measurement is correlated with, so that the second node starts the assistance MDT session correlated with the QoE measurement job. The second node may include the QoE reference into the corresponding assistance MDT report to help the QoE data processing node correlate the QoE report with the assistance MDT report;
a recording session ID for indicating which recording session in the QoE measurement job the current assistance MDT measurement is correlated with. The second node can include the recording session ID in the corresponding assistance MDT report to help the QoE data processing node correlate the QoE report with the assistance MDT report;
a period, which indicates the period of QoE measurement or a collection period, so that the second node can use it as the collection and measurement period of the assistance MDT session, to help the assistance MDT measurement keep consistent with QoE measurement in terms of time;
a period time indication: if the assistance MDT measurement and QoE measurement use the same measurement period, the first node should inform which time in the measurement period the assistance MDT measurement at the first node is going to, through an assistance MDT time indication. The time indication can be the relative time of start or end of the latest period or the absolute time of the start or end of the latest period. The second node can calculate or directly obtain the generation time of the first assistance MDT report at the second node according to the assistance MDT time indication. If the time is obtained by calculation, the period information should be measured;

a QoS flow ID, which is used to indicate the QoS flow used by the application layer configured with the assistance MDT measurement. The second node performs the assistance MDT measurement on one or more DRBs corresponding to the QoS flow, according to the QoS flow ID; and a QoS level (5QI or QCI), which is used to indicate the QoS level used by the application layer configured with the assistance MDT measurement. The second node performs the assistance MDT measurement on the QoS level, according to the QoS level.

The second node receives the handover request message and, if supported:

if the message contains the assistance MDT configuration and the assistance MDT state is "started", the second node starts the assistance MDT measurement;

if the assistance MDT configuration contains the QoS flow ID and the assistance MDT state is "started", the second node performs the assistance MDT measurement on the DRB corresponding to the QoS flow ID;

if the assistance MDT configuration includes the QoS level (such as QCI or 5QI) and the assistance MDT state is "started", the second node performs assistance MDT measurement on the QoS level;

if the assistance MDT configuration includes the period time indication, for indicating the time from the last generation of the assistance QoE report, which is time within one period. The second node should consider the time indication when generating the next assistance MDT report in order to keep alignment with the QoE report in terms of time. If the next assistance MDT report is not generated at the second node, the second node will add the time for the UE staying at the second node to the period time indication;

if a QoE reference is included in the assistance MDT configuration, the second node saves the information and includes the QoE reference in the generated MDT report, so that the QoE processing node can accurately correlate the QoE report with the assistance MDT report; and if the assistance MDT configuration includes the recording session ID, the second node saves the information and includes the recording session ID in the generated MDT report, so that the QoE processing node can accurately correlate the QoE report with the assistance MDT report.

In step 1202, the second node transmits a handover request acknowledgement message to the first node.

According to that received assistance MDT configuration and state information, the second node determines the assistance MDT measurements correlated with which QoE references are be started, and the assistance MDT measurements correlated with which QoE references are temporarily not started. For the measurement that needs to start the assistance MDT, the second node may decide to measure only the DRB(s) corresponding to the QoS flow ID according to the QoS flow ID, and the second node may also decide the next generation time of the assistance MDT report according to the period time indication and the collection period information. The generation of the MDT report corresponds to its correlated QoE report one by one. If the assistance MDT report is generated at the second node, the second node can place the application layer related information and the assistance MDT report together in the trace record, and the application layer related information can include a QoE reference, recording start time and/or a recording session ID. The trace record will be transmitted to the QoE data processing node directly or through the EM. The QoE data processing node analyzes and optimizes QoE, and can be an OAM, a TCE, an MCE, or a node with QoE analysis function in 3GPP network. The QoE data processing node can use the application layer related information to find the assistance MDT report correlated with the QoE report, and use the assistance MDT report to analyze the reasons of QoE degradation, and then identify network problems.

After receiving all QoE reports and assistance MDT reports, the QoE data processing node can correlate the QoE report with the assistance MDT report by the QoE reference and start time in the report. When a QoE measurement job corresponding to one QoE reference has multiple application layer sessions performed simultaneously, the QoE data processing node can correlate the QoE report with the assistance MDT report by the recording session ID in the report. In this way, the QoE data processing node can accurately correlate the QoE report with the assistance MDT report in any case, so as to analyze the QoE problems faster and more accurately.

As described above, in a measurement configuration and reporting method for assisting QoE optimization in the disclosure, even in the case of a UE handover, the assistance measurement of the network node or UE and the QoE measurements of the application layer are configured to start at the same time, and proceed synchronously. Through the provided correlation information, operators can correlate QoE measurement and assistance measurement results faster and more accurately, so as to analyze QoE problems, and then optimize the network and improve user experience. This method can also make the process and object of the assistance measurement more targeted, and reduce unnecessary measurement overhead and measurement redundancy, so as to improve the utilization rate of measurement information and save network resources.

Figure 14A:
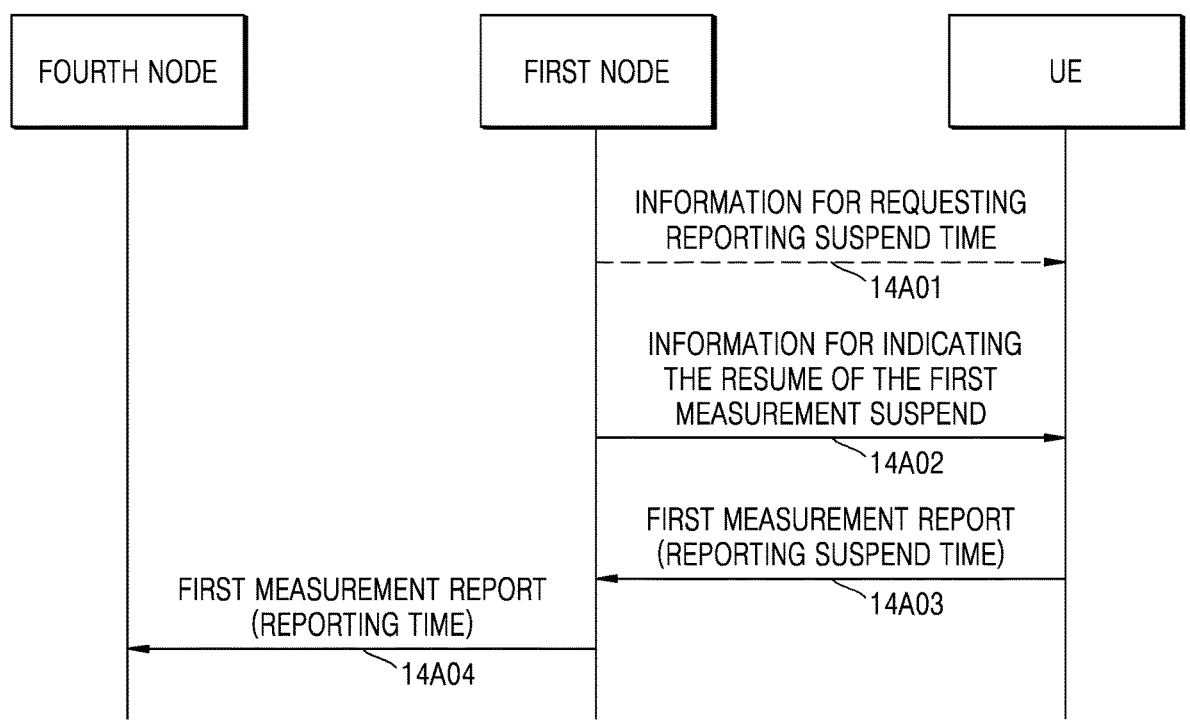
FIG. 14A illustrates a measurement configuration and reporting method for assisting optimization of QoE according to an embodiment.

FIG. 14A illustrates a measurement configuration and reporting method for assisting optimization of QoE according to an embodiment.

Referring to FIG. 14A, in step 14A01, the first node sends information for requesting reporting pausing time to the UE, and the information is used to indicate, to the UE, the need of recording and reporting the time from generating of a first measurement report to the sending out of the report by the UE when the reporting of the first measurement suspends, or refers to the time during which the first measurement report is buffered at the UE side. The first node may be a base station. The information for requesting the reporting pausing time may be included in the message for configuring the first measurement, or may also be included in the message for indicating the UE to pause reporting the first measurement. The first measurement may be an application layer measurement, such as a QoE measurement.

In step 14A02, the first node sends information for indicating the resume of the first measurement suspend to the UE.

In step 14A03, if there is a first measurement report for which the reporting is paused, the UE sends the first measurement report to the first node. If the UE receives the information for requesting the reporting pausing time in step 14A01 or decides to include the reporting pausing time in the first measurement report according to its own configuration, then the first measurement report includes the reporting pausing time. The reporting pausing time refers to the time from the generating of the first measurement report to the sending out of the report by the UE, or it may also refer to the time during which the first measurement report is buffered at the UE side, and the reporting pausing time is the first node visible or readable, such as RAN visible.

When the first node receives the first measurement report including the reporting pausing time, it can calculate the reporting time of the first measurement according to the time of receiving the first measurement report and the reporting pausing time. The reporting time refers to the time when the UE generates the first measurement report. The reporting time may be used to align with the time of the second measurement report, which may be an assistance measurement report, such as an MDT report. The first node can directly use the reporting time to align with the report of the second measurement in the time, or align the first measurement and the second measurement, and combine the aligned first measurement and second measurement and/or the aligned first measurement report and second measurement report to perform targeting of network problems or network optimization.

In step 14A04, if the alignment of the first measurement report and the second measurement report is performed by the fourth node, then the first node sends the first measurement report to the fourth node. The first measurement report includes the reporting time obtained in step 14A03, and the fourth node can perform time alignment with the time of the second measurement report according to the reporting time, and targets the network problem or performs network optimization analysis in combination of the aligned first measurement report and the second measurement report. The fourth node may be a base station or an OAM, and if it is an OAM, it may be a TEC or an MCE, or it may be other nodes for analyzing the first measurement report and the second measurement report.

As described above, in a measurement configuration and reporting method for assisting QoE optimization in the disclosure, even if the reporting time of the first measurement report and the second measurement report is different, e.g., due to the suspend of one of the measurements or the factors related to the reference clock, the first measurement report and the second measurement report are aligned in time, so that operators can correlate the QoE measurement result and the MDT measurement result more quickly and accurately, so as to analyze QoE problems, thus optimizing the network and improving user experience.

Figure 14B:
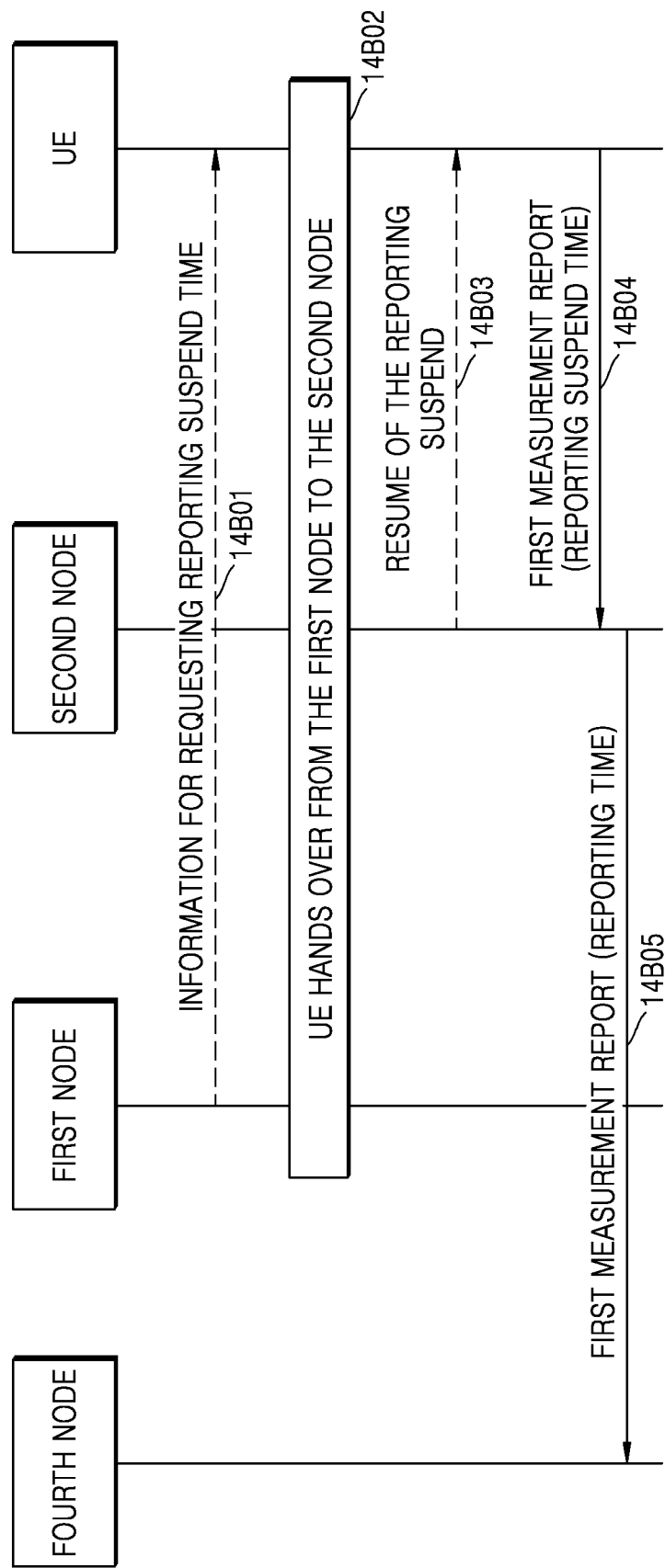
FIG. 14B illustrates a measurement configuration and reporting method for assisting optimization of QoE according to an embodiment.

FIG. 14B illustrates a measurement configuration and reporting method for assisting optimization of QoE according to an embodiment.

Referring to FIG. 14B, in step 14B01, the first node sends, to the UE, information for requesting the reporting pausing time. The information indicates, to the UE, the need of recording and reporting the time from generating of the first measurement report to the sending out of the report by the UE when the first measurement report is paused (or suspended), or it may also refer to the time during which the first measurement report is buffered at the UE side. The first node may be a base station. The information for requesting the reporting pausing time may be included in the message for configuring the first measurement, or may be included in the message for indicating the UE to pause reporting of the first measurement. The first measurement may be an application layer measurement, such as a QoE measurement.

In step 14B02, the UE hands over from the first node to the second node.

In step 14B03, the second node sends information, which indicates to the UE to resume suspension of the first measurement reporting.

In step 14B04, if there is a first measurement report for which the reporting is paused (i.e., suspended), the UE sends the first measurement report to the second node. If the UE receives the information for requesting the reporting pausing time in step 14B01 or decides to include the reporting pausing time in the first measurement report according to its own configuration, then the first measurement report includes the reporting pausing time. The reporting pausing time refers to the time from generating the first measurement report to sending out the report by the UE, or it may also refer to the time during which the first measurement report is buffered at the UE side, and the reporting pausing time is the first node visible or readable, such as RAN visible.

The second node receives the first measurement report including the reporting pausing time. The second node can calculate the reporting time of the first measurement according to the time of receiving the first measurement report and the reporting pausing time, and the reporting time refers to the time when the UE generates the first measurement report. The reporting time may be used to align with the time of the second measurement report, which may be an assistance measurement report for assisting the first measurement, such as an MDT report.

In step 14B05, the second node sends the first measurement report to the fourth node, wherein the first measurement report includes the reporting time. The fourth node can perform alignment with the time of the second measurement report according to the reporting time, and target the network problem or perform network optimizing in combination of the aligned first measurement report and second measurement report. The fourth node may be a base station or an OAM, and if it is an OAM, it may be a TEC or an MCE, or other nodes for analyzing the first measurement report and the second measurement report.

As described above, in a measurement configuration and reporting method for assisting QoE optimization in the disclosure, in a handover process, even if the reporting times of the first measurement report and the second measurement report are different, e.g., due to the suspending of one of the measurements or factors related to the reference clock, the time alignment between the first measurement report and the second measurement report can be ensured, so that operators can correlate the QoE measurement result with the MDT measurement result faster and more accurately, in order to analyze QoE problems, thereby optimizing the network and improving user experience.

Figure 15:
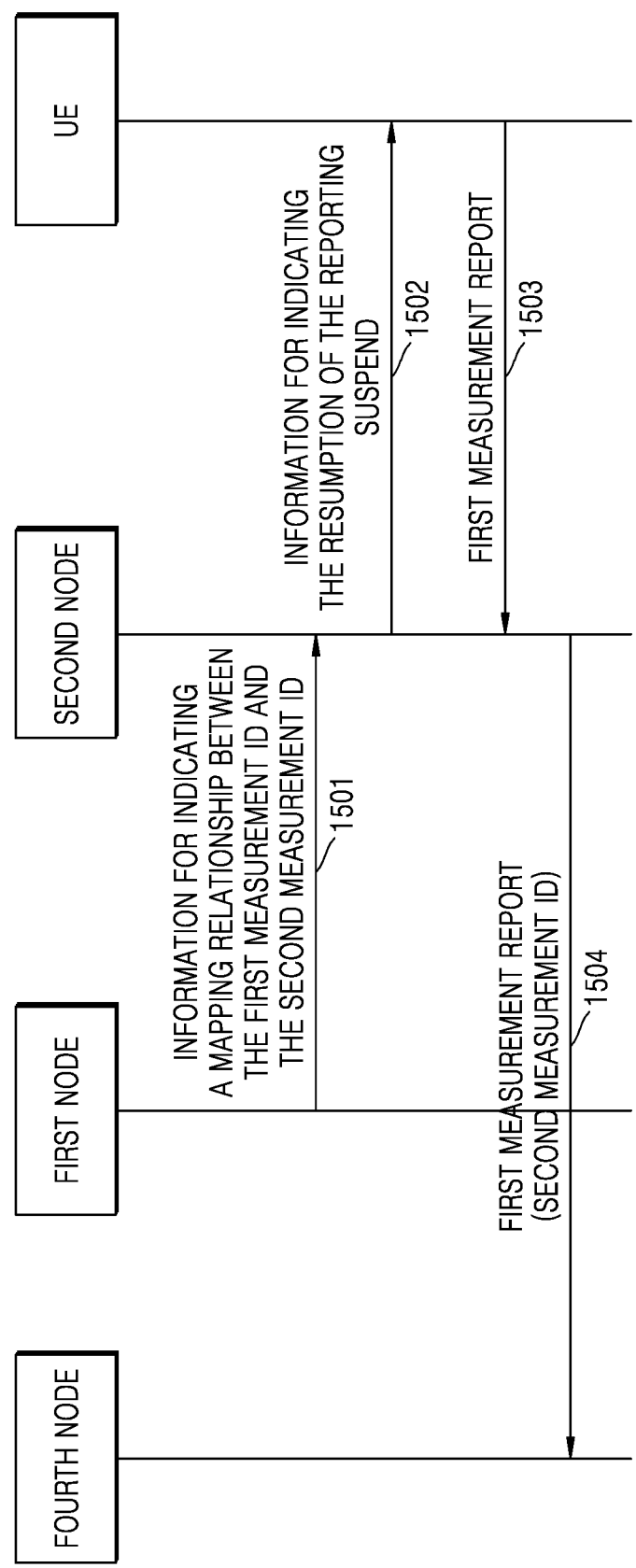
FIG. 15 illustrates a measurement configuration and reporting method for assisting optimization of QoE according to an embodiment.

FIG. 15 illustrates a measurement configuration and reporting method for assisting optimization of QoE according to an embodiment.

Referring to FIG. 15, in step 1501, the first node sends, to the second node, information for indicating a mapping relationship between the first measurement ID and the second measurement ID. The first node may be a core network or a base station, and the second node may be a base station. The information for indicating the mapping relationship between the first measurement ID and the second measurement ID may be transferred through at least one of the following messages:

when both the first node and the second node are base stations and the UE is handed over from the first node to the second node, the information for indicating the mapping relationship between the first measurement ID and the second measurement ID is included in a handover request message, i.e., the information is transferred through the handover request message sent by the first node as a source base station to the second node as a target base station;

when the first node is the core network and the second node is the base station, in the handover procedure based on the core network, such as an NG handover, the information for indicating the mapping relationship between the first measurement ID and the second measurement ID is included in the handover request message, i.e., the information is transferred through the handover request message sent by the first node as a target core network node (such as an AMF) to the second node as the target base station;

when the UE in an Inactive state moves to the coverage area of the second node and initiates an RRC resume procedure, while the first node is where the last serving cell of the UE was located, the information for indicating the mapping relationship between the first measurement ID and the second measurement ID is included in a retrieve UE context response message, i.e., the information transferred through the retrieve UE context response message sent by the first node as a last serving base station to the second node as a newly accessing base station; or when the first node wants to add the second node as the secondary node of the UE, the information for indicating the mapping relationship between the first measurement ID and the second measurement ID is included in a secondary node addition request message (e.g., a secondary node (SN) Addition Request Message), i.e., the message is sent through the SN addition request message sent by the first node as the Master Node (MN) to the second node as the SN.

For example, the first measurement may be a QoE measurement, i.e., the first measurement ID may be at least one of the following:

a QoE reference or a QoE reference list; or
an application layer ID or an application layer ID list.

Both the application layer ID and the QoE reference are IDs for indicating a QoE measurement collection task, and the node serving the UE (such as the first node or the second node) knows the mapping relationship between the application layer ID and the QoE reference.

For example, the second measurement is an MDT, and the second measurement ID may be a Trace ID, i.e., the information for indicating the mapping relationship between the first measurement ID and the second measurement ID may be at least one of the following cases:

a Trace ID corresponds to a QoE reference or an application layer ID; or
a Trace ID corresponds to a QoE reference list or an application layer ID list, wherein the QoE reference list includes at least two QoE references and the application layer ID list includes at least two application layer IDs.

The second node receives and saves the information.

In step 1502, if the UE is configured with the reporting pause of the first measurement, and the second node wants to resume the reporting paused, the second node may send information for indicating the resumption of the reporting pause to the UE.

The UE receives the information, and if the UE has a first measurement report (i.e., a buffered first measurement report) for which the reporting is paused, the UE prepares to send the first measurement report for which the reporting is paused to the second node.

In step 1503, the UE sends the first measurement report to the second node. The second node receives the first measurement report, and according to the first measurement ID in the first measurement report, queries the information obtained in step 1501 indicating the mapping relationship between the first measurement ID and the second measurement ID, and obtains the second measurement ID corresponding to the first measurement ID.

In step 1504, the second node sends the first measurement report to the fourth node, wherein the first measurement report includes the second measurement ID obtained in step 1503. The fourth node may be a base station or an OAM, and if it is an OAM, it may be a TEC or an MCE, or other nodes for analyzing the first measurement report and the second measurement report. The fourth node finds the second measurement report corresponding to the first measurement report according to the second measurement ID in the first measurement report, thus the ID correlation between the first measurement report and the second measurement report can be achieved, and then the time alignment can be achieved according to the time information in the first measurement report and the second measurement report. As a result, the correlation and time alignment between the first measurement report and the second measurement report is achieved for further optimizing analysis and problem location.

As described above, in a measurement configuration and reporting method for assisting QoE optimization in the disclosure, during the movement of the UE or in the dual-connectivity scenario, even if the reporting times of the first measurement report and the second measurement report are different, e.g., due to the suspend of one of the measurements or factors related to the reference clock, the ID correlation between the first measurement report and the second measurement report can be ensured, so that operators can correlate the QoE measurement result and the MDT measurement result more quickly and accurately, so as to analyze QoE problems, thereby optimizing the network and improving user experience.

Figure 16:
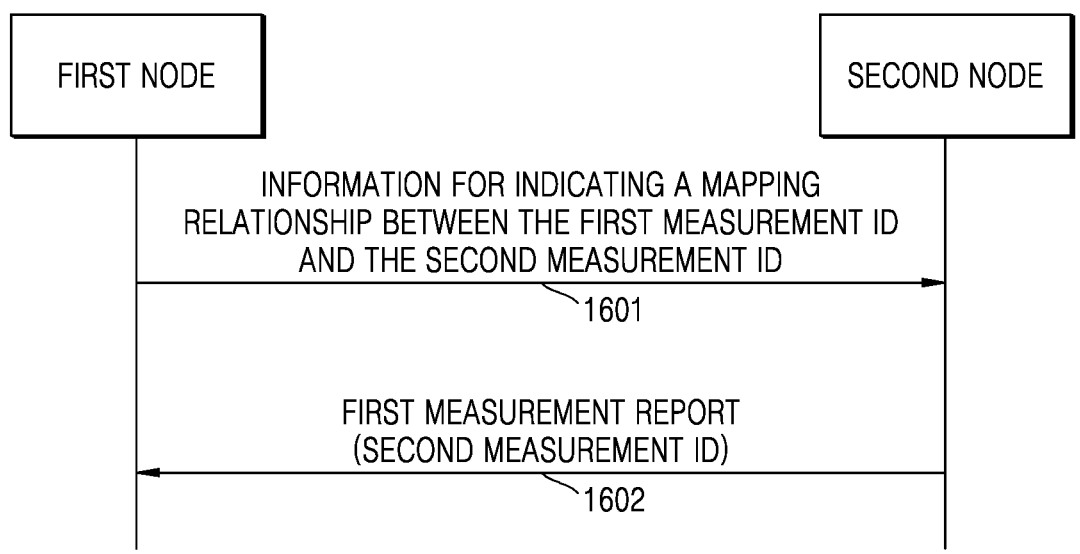
FIG. 16 illustrates a measurement configuration and reporting method for assisting optimization of QoE according to an embodiment.

FIG. 16 illustrates a measurement configuration and reporting method for assisting optimization of QoE according to an embodiment.

Referring to FIG. 16, in step 1601, the first node sends, to the second node, information for indicating the mapping relationship between the first measurement ID and the second measurement ID. The first node is the base station currently serving the UE, and the second node is the UE. The information for indicating the mapping relationship between the first measurement ID and the second measurement ID may be transferred through the RRC message, and the information may be included in the message for configuring the first measurement or other RRC messages.

The first measurement may be an application layer measurement, such as the QoE measurement, and the first measurement ID may be at least one of the following:

a QoE reference or a QoE reference list; or
an application layer ID or an application layer ID list.

Both the application layer ID and the QoE reference are IDs for indicating a QoE measurement collection task, and the node serving the UE knows the mapping relationship between the application layer ID and the QoE reference.

If the second measurement is an assistance measurement for assisting the application layer measurement, such as an MDT, then the second measurement ID may be a Trace ID. That is, the information for indicating the mapping relationship between the first measurement ID and the second measurement ID may be one of the following cases:
- a Trace ID corresponds to a QoE reference or an application layer ID; or
- a Trace ID corresponds to a QoE reference list or an application layer ID list, wherein the QoE reference list includes at least two QoE references and the application layer ID list includes at least two application layer IDs.

The second node receives and saves the information.

When the second node generates the first measurement report, according to the first measurement ID in the first measurement report, the information for indicating the mapping relationship between the first measurement ID and the second measurement ID obtained in step 1601 is queried to obtain the second measurement ID corresponding to the first measurement ID.

In step 1602, the second node sends the first measurement report to the first node. The first measurement report includes the second measurement ID obtained in step 1601. The first node may directly use or forward to the fourth node the first measurement report including the second measurement ID, the fourth node may be a base station or an OAM, and if it is an OAM, it may be a TEC or an MCE, or it may be other nodes for analyzing the first measurement report and the second measurement report.

The first node or the fourth node finds the second measurement report corresponding to the first measurement report according to the second measurement ID in the first measurement report, thereby completing correlation between the first measurement ID and the second measurement ID, and then completes time alignment according to the time information in the first measurement report and the second measurement report. Accordingly, the correlation and time alignment between the first measurement report and the second measurement report may be completed for further optimization analysis and problem location.

As described above, in a measurement configuration and reporting method for assisting QoE optimization in the disclosure, no matter whether there is a new base station serving the UE or not, even if the reporting times of the first measurement report and the second measurement report are different, the ID correlation between the first measurement report and the second measurement report can be ensured, so that operators can correlate the QoE measurement result and the MDT measurement result more quickly and accurately, in order to analyze QoE problems, thereby, optimizing the network and improving the user experience.

Figure 17:
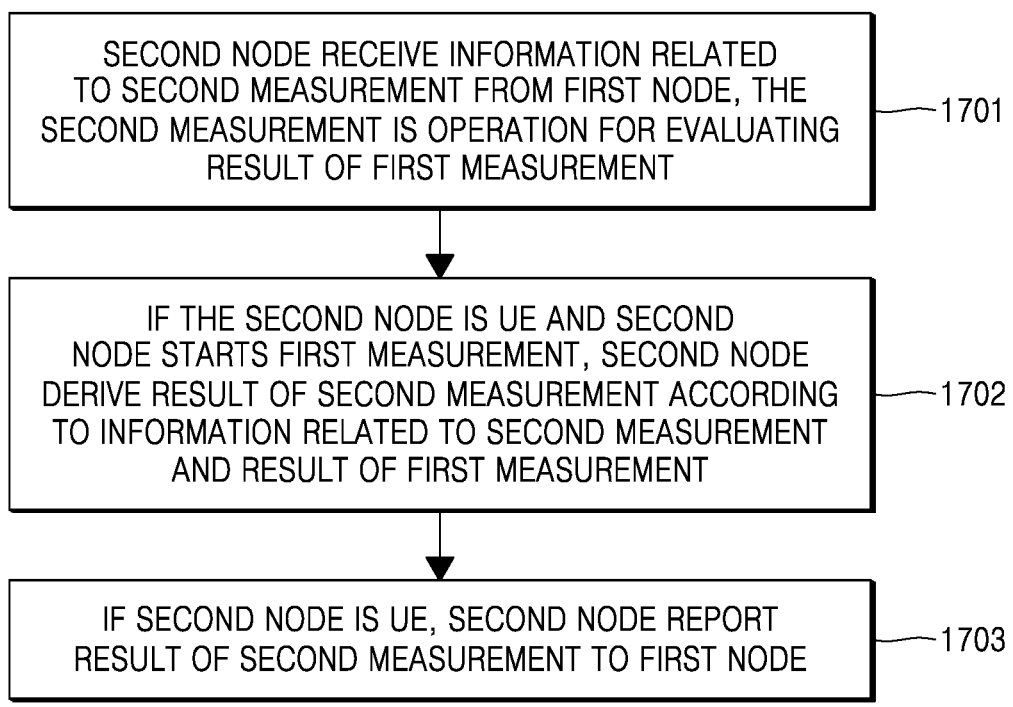
FIG. 17 illustrates a measurement configuration and reporting method for assisting optimization of QoE according to an embodiment.

FIG. 17 illustrates a measurement configuration and reporting method for assisting optimization of QoE according to an embodiment.

Referring to FIG. 17, in step 1701, the second node receives, from the first node, a first message including information related to the second measurement. The second measurement may be an operation for evaluating a result of the first measurement, e.g., the result of the first measurement is QoE metrics (e.g., underlying raw metrics), and the second measurement may include inputting the result of the first measurement into a specific model or formula (e.g., a MOS model), thereby calculating or deducing other result, which may be called the result of the second measurement.

The result of the second measurement may be a QoE evaluation value (e.g., a MOS value) and/or a certain evaluation value (e.g., a stalling-related evaluation), representing an overall QoE and/or an overall QoE of a certain aspect.

However, the second measurement and the result of the second measurement are not limited to the above-described examples.

The first node and the second node may be an OAM, a core network node, a base station, a CU, a CU-CP, a CU-UP, a DU, or a UE. The first node is a core network node, for example, the core network node is an AMF and the second node is a base station, and the first message may be an initial context setup request message, a UE context modification request message, a trace start message, a handover request message or a handover required message.

If the first node and the second node are both base stations, the first message may be a handover request message, an secondary node addition request message, a retrieve UE context response message, or a trace start message, etc.

If the first node is a CU-CP, the second node may be a CU-UP, and the first message may be a bearer context setup request message, a bearer context modification request message, or a trace start message.

If the first node is a CU, the second node may be a DU, and the first message may be a UE context setup request message, a UE context modification request message, or a trace start message.

If the first node is a base station, the second node may be a UE, the first message may be an RRC message, and the RRC message may be an RRC reconfiguration message or an RRC release message.

However, the first node, the second node, and/or the first message are not limited to the above-described examples. For example, the first message may also be transferred between other interfaces, and the first node and the second node involved in the interface include but are not limited to the network entities listed in the above examples.

One or more second measurement may be configured for the second node, and each second measurement may be identified by a second measurement ID or a first measurement ID (e.g., a QoE reference or application layer ID MeasConfigAppLayerId). The information related to the second measurement may include one or more items of second measurement information, and each item of the second measurement information may include at least one of:
- a second measurement ID, used to represent a specific second measurement, such as a QoE reference or MeasConfigAppLayerId;
- an evaluation model, which may be a specific model (e.g., an International Telecommunication Union (ITU) Telecommunication Standardization Sector ITU-T MOS model) and/or a model label (e.g., mode 0) or it may be a sub-model in the standard model (e.g., a model or formula related to stalling defined in ITU-T I.14) or a calculation formula. However, the specific content of the evaluation model information item is not limited to the above-described examples. The UE can take the result of the first measurement as the input of the evaluation model and take the output of the first measurement through the evaluation model as the result of the second measurement;
- a model input, wherein the input of the evaluation model is the measurement result of the first measurement or a subset of the measurement result of the first measurement (e.g., it may be the input defined in I.14 defined by ITU-T, i.e., the input related to stalling, or a Playlist or InitialPlayoutDelay defined by 3GPP), which is used to indicate which information in the result of the first measurement performed by UE needs to be used as the input of the evaluation model;

sampling time, which is used to indicate the time corresponding to one measurement of the second measurement by the first measurement result as the model input. For example, for a video service, the sampling time may be a duration of video sequence;

a windowing length, which is used to indicate how often the second measurement is made or calculated. The windowing length may be a time interval, such as but not limited to 1 minute; and the model output, which is used to indicate the result of the second measurement, e.g., it may be a 5-point MOS value, or an evaluation value of a certain aspect, such as an evaluation value related to stalling or buffering, such as a number of stalling events, a duration of stalling events, a frequency of stalling events and/or a ratio of stalling duration, etc.

In the description of the embodiments of the disclosure, "stalling" refers to a phenomenon of the pause of media playout, which is usually caused by re-buffering. Re-buffering refers to a condition that occurs in a media buffer area. In this condition, a buffer fill level is sufficiently depleted, resulting in suspended media playout. In the description of the present application, "stalling", "re-buffering", "buffering", "re-caching", "caching" or similar expressions are used to indicate the media play pause, unless the context clearly indicates that they have other meanings. That is, throughout the description of the present application, "stalling", "re-buffering", "buffering", "re-caching", "caching" or similar expressions may be used interchangeably to express the same or similar meanings.

In step 1702, the second node receives and stores the information related to the second measurement, the second node may be a node that performs the first measurement (such as a UE), or a node that receives the result of the first measurement (such as a base station, and in this case the result of the first measurement is visible to the base station).

After the result of the first measurement is obtained by the second node through measurement performed by itself or from other nodes, the result of the second measurement is generated or deduced by the second node according to the information related to the second measurement and the result of the first measurement. The result of the second measurement may be at least one of:

a MOS value or a QoE value (e.g., a RAN visible QoE value), used to indicate an evaluation result of the first measurement, i.e., how the service QoE is, for example, the MOS value or the QoE value is in a 5-point score system, and the higher the score, the better the QoE is, otherwise, the worse it is;

the number of stalling times, which refers to a total number of stalling times in one sampling time. It can be understood that the more the stalling times, the worse the QoE;

the duration of stalling events, which refers to a sum of the durations of all stalling events in one sampling time. It can be understood that the longer the duration of the stalling events, the worse the QoE;

a frequency of stalling events, which refers to a quotient from the number of stalling events divided by a time of service (i.e., a sampling time) in one sampling time. The more frequent the stalling events, the worse the QoE; or a ratio of stalling duration, which refers to a quotient from the total duration of stalling divided by the time of service (i.e., a sampling time) in one sampling time. The larger the ratio of stalling, the worse the QoE.

In step 1703, if the second node is the UE and the first node is the base station, the second node sends a second measurement report to the first node, wherein the second measurement report includes the result of the second measurement. If the first node is the base station, after the second measurement report is received by the first node, the first node optimizes and adjusts functions in the first node according to the result of the second measurement included in the second measurement report. If the second node is the base station, the second node may directly use the result of the second measurement to optimize and adjust the functions of the second node, or it may also forward the result of the second measurement to other nodes. For example, according to the results of the second measurement fed back by multiple UEs, the base station can determine the experience of which UE is worse and the experience of which UE is better. A scheduling priority of service should be adjusted to ensure a service QoE of a UE with poor QoE experience, but at the same time to ensure the QoE quality of other UEs.

As described above, in a measurement configuration and reporting method for assisting optimization of QoE of the disclosure, nodes that need optimization (e.g., the base station) can collect the measurement results (i.e., QoE values) evaluated under a unified standard, so that the nodes that need optimization can make a suitable optimization scheme according to the measurement results. As such, the service experience of other users is ensured while improving the user experience with poor QoE quality, possibly enhancing the user loyalty and increasing revenue for operators.

Figure 13:
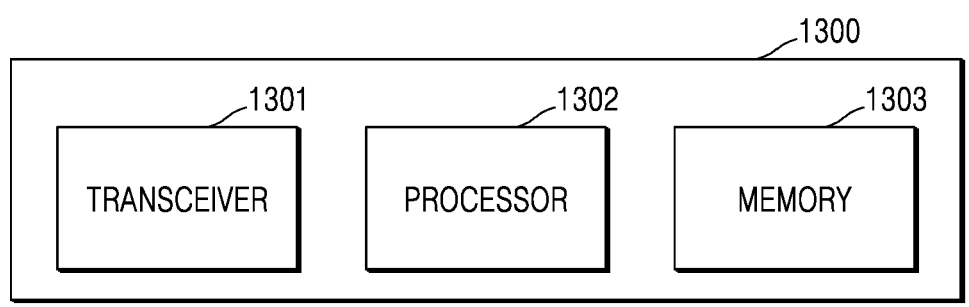
FIG. 13 illustrates a communication device according to an embodiment.

FIG. 13 illustrates a communication device 1300 according to an embodiment.

Referring to FIG. 13, the communication device may be configured to implement any one or more of the above-described methods of the disclosure. Therefore, it should be understood that the communication device 1300 can be, e.g., a first node, a second node, a third node, a UE, one or more of the first node or the second node, various devices, nodes, or a part of nodes described herein.

The communication device 1300 includes a transceiver 1301, a processor 1302, and a memory 1303. The communication device 1300 may be implemented by more or fewer components than those illustrated in FIG. 13. In addition, the processor 1302 and the transceiver 1301 and the memory 1303 may be implemented as a single chip.

The transceiver 1301 is configured to receive and/or transmit signals. The signal may include control information and data. In addition, the transceiver 1301 may receive the signal through a wireless channel and output the signal to the processor 1302. The transceiver 1301 may transmit a signal output from the processor 1302 through wireless channel. The transceiver 1301 may include an RF transmitter for up-converting and amplifying a transmitted signal, and an RF receiver for down-converting a frequency of a received signal. However, the transceiver 1301 may also be implemented by more or fewer components than described above.

The processor 1302 may include one or more processors or other processing devices that control the proposed function, process, and/or method. Operation of the communication device 1300 may be implemented by the processor 1302. The processor 1302 is operatively connected to the transceiver 1301 and the memory 1303. The processor 1302 may be implemented as one or more processors for operating according to one or more of the above-described methods of the disclosure.

The memory 1303 may store the control information or the data included in a signal obtained by the communication device 1300. The memory 1303 may be connected to the processor 1302 and store at least one instruction or a protocol or a parameter for the proposed function, process, and/or method. The memory 1303 may include read-only memory (ROM), random access memory (RAM), a hard disk, a compact disc (CD)-ROM, a digital versatile disc (DVD) and/or other storage devices. The memory 1303 is configured to store computer programs and data. The memory 1303 may include a non-transitory memory for storing operations and/or code instructions executable by the processor 1302. The memory 1303 may include processor readable non-transitory programs or instructions that, when executed, cause the processor 1302 to implement the steps of any one or more of the methods according to various embodiments of the present disclosure. The memory 1303 may also include RAM or buffer(s) to store intermediate processing data from various functions performed by the processor 1302.

Those of ordinary skill in the art will recognize that the description of the measurement method of the present disclosure is illustrative only and is not intended to be limiting in any way. Other embodiments will readily occur to those of ordinary skill in the art having the benefit of this disclosure.

For the sake of clarity, all conventional features of embodiments of the measurement method and the device of the present disclosure have not been illustrated and described. Of course, it should be understood that in the development of any such actual implementation of the measurement method and the device, in order to achieve the specific goals of developers, such as conforming to constraints related to applications, systems, networks and businesses, many implementation-specific decisions may need to be made, and these specific goals will change with different implementations and different developers.

The modules, processing operations and/or data structures described according to the present disclosure may be implemented using various types of operating systems, computing platforms, network devices, computer programs and/or general-purpose machines. In addition, those of ordinary skill in the art will recognize that less general devices, such as hardwired devices, field programmable gate array (FPGA), application specific integrated circuits (ASIC), etc., may also be used. In a case that a method including a series of operations and sub-operations is implemented by a processor, a computer or a machine, and those operations and sub-operations may be stored as a series of non-transitory code instructions readable by the processor, the computer or the machine, they may be stored on tangible and/or non-transient medium.

The modules of the measurement method and device described herein may include software, firmware, hardware or any combination(s) of software, firmware or hardware suitable for the purposes described herein.

In the measurement method described herein, various operations and sub-operations may be performed in various orders, and some of the operations and sub-operations may be optional.

Although the foregoing disclosure of the present application has been made by non-limiting illustrative embodiments, these embodiments may be arbitrarily modified within the scope of the appended claims without departing from the spirit and essence of the disclosure.

While the disclosure has been shown and described with reference to certain embodiments thereof, it will be apparent to those skilled in the art that the measurement method and device according to the present disclosure is not limited to these embodiments, and various changes in form and details may be made therein without departing from the scope of the present disclosure as defined by the appended claims and their equivalents.

What is claimed is:

1. A method performed by a base station in a wireless communication system, the method comprising:
receiving, from a core network entity, an initial context setup request message including application layer measurement configuration information related to a quality of experience (QoE) measurement, the application layer measurement configuration information including information indicating a minimization of drive test (MDT) measurement required to be aligned with the QoE measurement, wherein the MDT measurement is associated with a QoE analysis;
transmitting, to a user equipment (UE), a radio resource control (RRC) message including a QoE measurement configuration, the QoE measurement configuration including start or stop information indicating to the UE to transmit a start indication or a stop indication for a session of the QoE measurement in an application layer;
receiving, from the UE, a message including the start indication for the session of the QoE measurement in the application layer; and
upon or after receiving the start indication, transmitting a message to the UE for activating the MDT measurement that is to be aligned with the QoE measurement.

2. The method of claim 1, wherein the message further includes starting time information of the QoE measurement.

3. The method of claim 1, further comprising:
receiving, from the UE, the stop indication; and
transmitting a message for deactivating the MDT measurement, based on the stop indication.

4. The method of claim 1, wherein the message further includes a recording session identifier (ID) related to the session.

5. The method of claim 1, wherein the message further includes a QoE reference associated with the QoE measurement.

6. The method of claim 1, wherein the RRC message includes an RRC reconfiguration message.

7. The method of claim 1, further comprising:
transmitting, to a target base station, a handover request message including the application layer measurement configuration information.

8. The method of claim 7, wherein the handover request message further includes measurement status information indicating whether the session is ongoing.

9. A method performed by a user equipment (UE) in a wireless communication system, the method comprising:
receiving, from a base station, a radio resource control (RRC) message including a quality of experience (QoE) measurement configuration, the QoE measurement configuration including start or stop information indicating to the UE to transmit a start indication or a stop indication for a session of a QoE measurement in an application layer; and
transmitting, to the base station, a message including the start indication for the session of the QoE measurement in the application layer.

10. The method of claim 9, wherein the message further includes starting time information of the QoE measurement.

11. The method of claim 9, further comprising:
transmitting, to the base station, the stop indication.

12. The method of claim 9, wherein the message further includes a QoE reference associated with the QoE measurement.

13. The method of claim 9, wherein the RRC message includes an RRC reconfiguration message.

14. A base station in a wireless communication system, the base station comprising:
    a transceiver; and
    at least one processor operably coupled with the transceiver and configured to:
        receive, from a core network entity, an initial context setup request message including application layer measurement configuration information related to a quality of experience (QoE) measurement, the application layer measurement configuration information including information indicating a minimization of drive test (MDT) measurement required to be aligned with the QoE measurement, wherein the MDT measurement is associated with a QoE analysis,
        transmit, to a user equipment (UE), a radio resource control (RRC) message including a QoE measurement configuration, the QoE measurement configuration including start or stop information indicating to the UE to transmit a start indication or a stop indication for a session of the QoE measurement in an application layer,
        receive, from the UE, a message including the start indication for the session of the QoE measurement in the application layer, and
        upon or after receiving the start indication, transmit a message to the UE for activating the MDT measurement that is to be aligned with the QoE measurement.

15. The base station of claim 14, wherein the at least one processor is further configured to:
    receive, from the UE, the stop indication, and
    transmit a message for deactivating the MDT measurement, based on the stop indication.

16. The base station of claim 15, wherein the stop indication indicates that the QoE measurement is ended.

17. The base station of claim 14, wherein the RRC message includes an RRC reconfiguration message.

18. A user equipment (UE) in a wireless communication system, the UE comprising:
    a transceiver; and
    at least one processor operably coupled with the transceiver and configured to:
        receive, from a base station, a radio resource control (RRC) message including a quality of experience (QoE) measurement configuration, the QoE measurement configuration including start or stop information indicating to the UE to transmit a start indication or a stop indication for a session of a QoE measurement in an application layer, and
        transmit, to the base station, a message including the start indication for the session of the QoE measurement in the application layer.

19. The UE of claim 18, wherein the message further includes starting time information of the QoE measurement.

* * * * *